United States Patent
Thio et al.

(10) Patent No.: US 12,474,169 B2
(45) Date of Patent: Nov. 18, 2025

(54) STEP-BASED POSITIONING

(71) Applicant: Sonitor Technologies AS, Oslo (NO)

(72) Inventors: Vincent Martello Kwie Hoe Thio, Oslo (NO); Wilfred Edwin Booij, Oslo (NO)

(73) Assignee: Sonitor Technologies AS, Oslo (NO)

(*) Notice: Subject to any disclaimer, the term of this patent is extended or adjusted under 35 U.S.C. 154(b) by 90 days.

(21) Appl. No.: 18/269,863

(22) PCT Filed: Jan. 20, 2022

(86) PCT No.: PCT/GB2022/050155
§ 371 (c)(1),
(2) Date: Jun. 27, 2023

(87) PCT Pub. No.: WO2022/157497
PCT Pub. Date: Jul. 28, 2022

(65) Prior Publication Data
US 2024/0060780 A1    Feb. 22, 2024

(30) Foreign Application Priority Data
Jan. 20, 2021    (GB) ...................................... 2100781

(51) Int. Cl.
*G01C 21/16* (2006.01)
*G01C 22/00* (2006.01)
*G01S 5/30* (2006.01)

(52) U.S. Cl.
CPC ....... *G01C 21/1652* (2020.08); *G01C 22/006* (2013.01); *G01S 5/30* (2013.01)

(58) Field of Classification Search
CPC ...... G01C 21/1652; G01C 22/006; G01S 5/30
See application file for complete search history.

(56) References Cited

U.S. PATENT DOCUMENTS 9,820,100 B1 * 11/2017 Jarvis .................... H04W 4/029
2016/0018225 A1    1/2016 Yang et al.

FOREIGN PATENT DOCUMENTS

WO    WO 2018/162885 A1    9/2018

OTHER PUBLICATIONS

International Search Report mailed Jul. 14, 2022 for PCT Appl. No. PCT/GB2022/050155, 6 pages.

(Continued)

*Primary Examiner* — Yuen Wong
(74) *Attorney, Agent, or Firm* — Sterne, Kessler, Goldstein & Fox P.L.L.C.

(57) ABSTRACT

In a positioning system (100) for estimating the position of a mobile device (7), a processing system (9) receives external-range data, representative of a range between the mobile device and an external unit (2, 3, 4, 5), and acceleration data representative of acceleration of the mobile device due to its movement as it is carried by a person (6). The acceleration data is processed in a step-detection algorithm to determine step-distance data representative of a time series of step-data-based distances travelled by the mobile device, and step-distance data is processed to determine a step-data-based position estimate for the mobile device. A position estimate for the mobile device is determined by solving an optimisation problem comprising a first cost term based on distance to positions located at said range from the external unit, and a second cost term based on distance to the step-data-based position estimate or to positions located at a step-data-based distance from said step-data-based position estimate.

16 Claims, 10 Drawing Sheets

(56) References Cited

OTHER PUBLICATIONS

Written Opinion mailed Jul. 14, 2022 for PCT Appl. No. PCT/GB2022/050155, 12 pages.
Wang et al., "Deep neural network-based Wi-Fi/pedestrian dead reckoning indoor positioning system using adaptive robust factor graph model", IET Radar Sonar Navigation, The Institution of Engineering and Technology, UK, vol. 14, No. 1, Jan. 1, 2020, pp. 36-47, 12 pages.
Thio et al., "Relative heading estimation for pedestrians based on the gravity vector," IEEE Sensors Journal, vol. 21, No. 6, Jan. 18, 2021, 8 pages.
"Google Maps Changes The Blue Dot Showing Where You To A Shining Blue Beam", (articles/news/google-maps-changes-blue-dot-showing-where-you-shining-blue-beam), Feb. 18, 2020, 3 pages.

\* cited by examiner

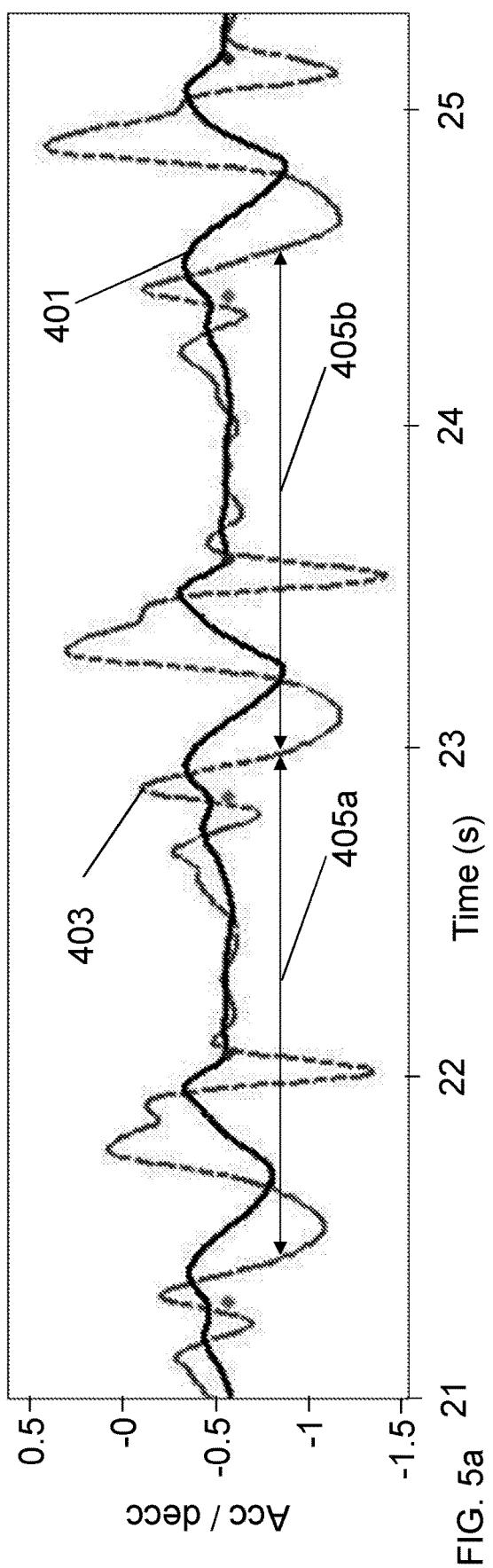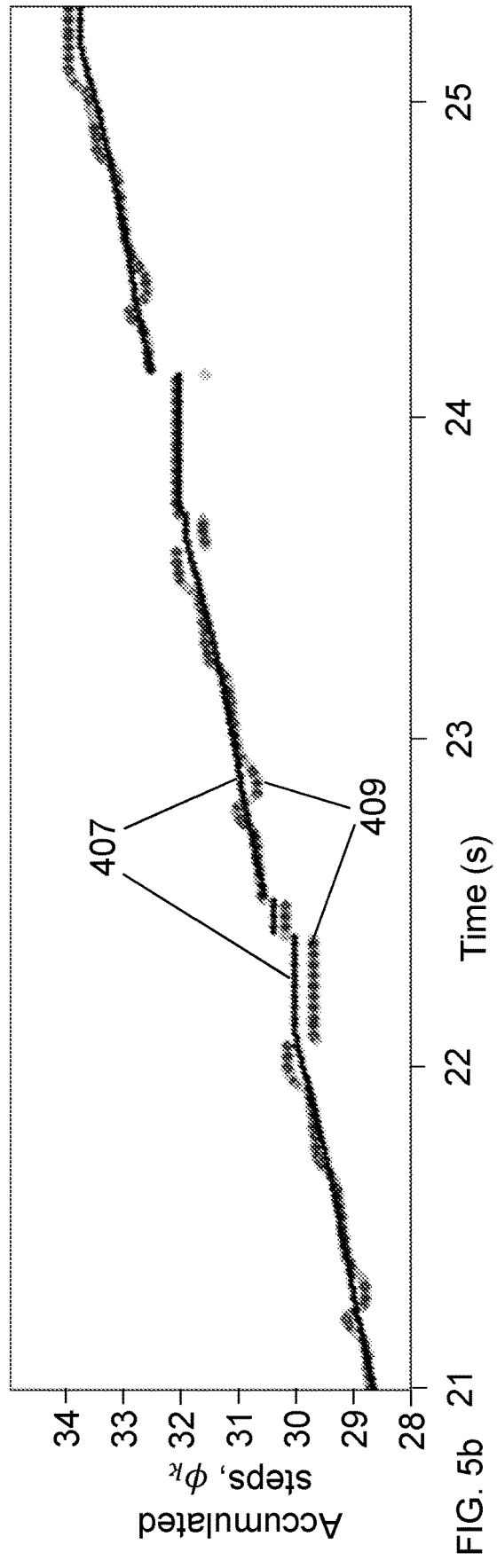
FIG. 5a
FIG. 5b

STEP-BASED POSITIONING

BACKGROUND OF THE INVENTION

This invention relates to systems and methods for determining the position of, or distance travelled by, a mobile device.

It is known to use signals, such as ultrasonic signals, to determine the position of mobile units or tags, in two or three dimensions, by transmitting acoustic signals from a plurality of acoustic transmitter units, which may be fixed to the walls or ceilings of a building. The signals encode identifiers of the respective transmitters units. These signals are received by the mobile devices, which may be attached to objects such as people or equipment. If the positions of the acoustic transmitter units are known, then the times at which a mobile device receives signals transmitted by the respective transmitter units (i.e. the times of arrival) can be used to estimate the position of the mobile device within the environment, using geometric principles relating to the propagation of the signals—e.g. by solving an equation relating to the intersection of circles, spheres or hyperboloids.

For example, WO 2019/038542 discloses an acoustic positioning system in which a plurality of static transmitter units transmit phase-modulated ultrasonic signatures at regular intervals. The signatures can be received by a mobile device and their times of arrival used to estimate the position of the device using a geometric multilateration process. The position of the mobile device can be displayed on a map or plan of the environment.

Positioning using acoustic signals can be effective in indoor environments where deployment of transmitter units is significant, and in which mobile devices are always within listening range of one or more transmitter units. However, in areas in which a low signal-to-noise ratio (SNR) is likely, for example where many surfaces that are highly reflective to sound waves are present, there may be uncertainty as to the source of the acoustic signal—i.e. in the identity of the acoustic transmitter unit that transmitted the received acoustic signal. When there is uncertainty in the identity of the transmitter unit that transmitted a particular signal received by the mobile device, there will be a corresponding uncertainty in the final position estimate for the mobile device, since geometric positioning algorithms are based on knowing the respective source location for each acoustic signal received by the mobile device.

The present invention provides a novel approach that seeks to enable improved positioning accuracy for a mobile device in a positioning system.

SUMMARY OF THE INVENTION

From a first aspect, the invention provides a positioning system for estimating the position of a mobile device, the positioning system comprising a processing system configured to:
  receive external-range data representative of a range between the mobile device and an external unit, wherein the external-range data is determined using a signal travelling between the external unit and the mobile device;
  receive acceleration data, determined from an accelerometer of the mobile device, wherein the acceleration data is representative of acceleration of the mobile device due to a movement of the mobile device as it is carried by a person;
  process the acceleration data in a step-detection algorithm to determine step-distance data representative of a time series of step-data-based distances travelled by the mobile device;
  process the step-distance data to determine a step-data-based position estimate for the mobile device; and
  determine a position estimate for the mobile device by solving an optimisation problem for an objective function comprising a first cost term that depends on distance to positions located at said range from the external unit, and a second cost term that depends on distance to said step-data-based position estimate or to positions located at a step-data-based distance from said step-data-based position estimate.

From a second aspect, the invention provides a method of estimating the position of a mobile device, the method comprising:
  receiving external-range data representative of a range between the mobile device and an external unit, wherein the external-range data is determined using a signal travelling between the external unit and the mobile device;
  receiving acceleration data, determined from an accelerometer of the mobile device, wherein the acceleration data is representative of acceleration of the mobile device due to a movement of the mobile device as it is carried by a person;
  processing the acceleration data in a step-detection algorithm to determine step-distance data representative of a time series of step-data-based distances travelled by the mobile device;
  processing the step-distance data to determine a step-data-based position estimate for the mobile device; and
  determining a position estimate for the mobile device by solving an optimisation problem for an objective function comprising a first cost term that depends on distance to positions located at said range from the external unit, and a second cost term that depends on distance to said step-data-based position estimate or to positions located at a step-data-based distance from said step-data-based position estimate.

From a third aspect, the invention provides a computer program comprising instructions which, when executed on a processing system, cause the processing system to:
  receive external-range data representative of a range between a mobile device and a unit external to the mobile device, wherein the external-range data is determined using a signal travelling between the external unit and the mobile device;
  receive acceleration data, determined from an accelerometer of the mobile device, wherein the acceleration data is representative of acceleration of the mobile device due to a movement of the mobile device as it is carried by a person;
  process the acceleration data in a step-detection algorithm to determine step-distance data representative of a time series of step-data-based distances travelled by the mobile device;
  process the step-distance data to determine a step-data-based position estimate for the mobile device; and
  determine a position estimate for the mobile device by solving an optimisation problem for an objective function comprising a first cost term that depends on distance to positions located at said range from the external unit, and a second cost term that depends on distance to said step-data-based position estimate or to positions located at a step-data-based distance from said step-data-based position estimate.

Thus it will be seen that, in accordance with embodiments of the invention, acceleration data determined by the mobile device itself is combined with range data, determined using one or more external signals (e.g. acoustic signals), in a common optimisation problem, which is solved to determine a position estimate for the mobile device. This enables the position of the mobile device to be determined accurately even when communication with an external unit is impaired or unavailable—e.g. due to high SNR or because the mobile device has entered a signal "dead spot". It may also, in some embodiments, enable position estimates to be determined more frequently than would be possible if using only the signals from the external unit or units, which may be sent relatively infrequently, e.g. due to bandwidth or power constraints.

The process may be repeated to determine a time series of position estimates—i.e. solving the same optimisation problem, with the same cost terms, but with updated range and step-data values, at each of a succession of time instances.

The first cost term may penalise solutions that lie outside the determined range of the external unit, while the second cost term may penalise solutions that are inconsistent with the step-based dead-reckoning position estimates generated using the accelerometer of the mobile device. Combining the acceleration data and the external range data in a single optimisation problem enables both sources of data to influence the final position estimate in a way that can, at least in some embodiments, easily be adjusted (e.g. by setting one or more weight parameters in the optimisation problem). Incorporating both sources into one optimisation problem can also facilitate particularly efficient implementation, requiring relatively little processing power; this may be especially beneficial in embodiments where position estimates are calculated on a resource-constrained mobile device, such as a battery-powered mobile telephone.

The positioning system may comprise the mobile device.

The positioning system may comprise the external unit. It may comprise a plurality of external units. The external units may be static (e.g. fixed to a wall or ceiling of a building), although this is not essential. The processing system may store or be configured to access or determine location data representative of the location of each external unit.

The processing system may receive the external-range data from another system, e.g. over a network connection from a further processing system, or it may be configured to generate the external-range data itself. The external-range data may be determined from timing information for the signal, such as from a time of flight of the signal. It may be alternatively or additionally be determined from an amplitude or power of the signal, or another property of the signal.

The signal may travel from the mobile device to the external unit, or from the external unit to the mobile device. In one set of embodiments, the external unit is a transmitter or transceiver unit. The signal may be a radio signal (e.g. a Bluetooth™ beacon), an acoustic (e.g. ultrasound) signal, an optical signal, or any other signal. It may travel through air between the external unit and the mobile device. The mobile device may comprise a radio antenna, acoustic transducer, or optical transducer, for receiving or transmitting the signal. In a preferred set of embodiments, the mobile receiver comprises at least one microphone for receiving ultrasonic signals. The mobile device may be configured to exchange a plurality signals with a plurality of external units.

The processing system may receive the acceleration data from another system, e.g. over a network connection from a further processing system, but it is preferably configured to generate the acceleration data itself.

The acceleration data may comprise a time series of acceleration data. The external-range data may comprise a time series of external-range data—e.g. determined from a succession of signals exchanged with the external unit over time. In some embodiments, the acceleration data may have an update frequency (e.g. one update every ten or hundred milliseconds) that is higher than an update frequency of the external-range data (e.g. one update every second); in this way, the use of acceleration data may facilitate more rapid tracking of the mobile device than would be possible using the external-range data alone.

Each cost term may be a continuous function of distance. It may be continuously differentiable.

The first cost term may be an increasing (preferably strictly increasing) function of a distance between the position estimate to be determined and positions located at said range from the external unit.

The objective function may comprise a plurality of first cost terms, each depending on distance to respective positions located at a respective range from a respective external unit, at least some of which may be different external units of a plurality of external units configured to exchange respective signals with the mobile device (e.g. to transmit acoustic signals that are received by the mobile device).

The second cost term may be an increasing (preferably strictly increasing) function of a distance between the position estimate to be determined and said step-data-based position estimate, or positions located at a step-data-based distance from said step-data-based position estimate.

The objective function (e.g. cost function) may comprise a linear combination of each first cost term and the second cost term. The objective function may optionally comprise one or more further cost terms, which may be dependent on other sensor data, such as from an air-pressure sensor, or on a Doppler-shift measurement determined for the signal.

The optimisation problem may be a minimization problem.

The second cost term may be weighted relative to the first cost term in the optimisation problem. This weighting may depend on a weight parameter which may be variable. The processing system may be configured for receiving data for controlling the weight parameter. This can allow the influence of the step-based dead-reckoning to be conveniently adjusted relative to the external signal-based positioning.

Each cost term in the objective function may have a respective weighting factor. The objective function may comprise a sum of the weighted cost terms. Each first cost term may be weighted at least partly in dependence on how long ago the signal was received from the respective external unit, e.g. with newer range data being weighted more highly than older range data.

In some embodiments, one or more of the cost terms in the objective function is weighted at least partly in dependence on an error term—e.g. a variance or covariance.

The optimisation problem for determining the position estimate may be a least-squares problem. It may be a linear regression problem. It may be solved using a regression analysis, such as a weighted least-squares method. It may be solved using the Newton-Raphson method or a quasi-Newton method.

In a first set of embodiments, the second cost term depends on distance to said step-data-based position estimate, while in a second set of embodiments, the second cost term depends on distance to positions located at a step-data-based distance from said step-data-based position estimate.

In this second set of embodiments, a range around the step-data-based position estimate is established, which may be similar in nature to the range that is determined for the external unit. In this way, the step-based data may be incorporated into the optimisation problem similarly to the external units—i.e. as if it were a "synthetic" external unit. This may simplify the implementation and/or operation of the optimisation problem solving algorithm. The step-data-based distance may be determined from one or more preceding step-data-based position estimates (i.e. for an earlier point in time). It may, for example, be set to equal the difference between the two most recent step-data-based position estimates calculated from the step-distance data. The second cost term may optionally be weighted in the objective function at least in part in dependence on a variance of the step-data-based distance determined over time.

In the first set of embodiments, the second cost term may depend directly on distance to said step-data-based position estimate. This can allow only the latest position estimate to be used, without reliance on earlier estimates. The second term may be a function of (e.g. may equal or be proportional to) the Mahalanobis distance to the step-data-based position estimate. Alternatively, it may be determined from a matrix of sigma points each weighted by a respective position covariance.

The signal or signals may carry encoded data. They may comprise frequency-shift-key (FSK) modulated data. They may comprise continuous-phase FSK (CP-FSK) modulated data. The data may comprise identification data, which may be specific to a respective external unit (e.g. a unit-specific identifier or code).

The signal may be received by the mobile device. It may be down-mixed by the mobile device in the analogue and/or digital domains. It may be processed in any appropriate way to determine the range. The processing system may identify an external unit that transmitted a signal by decoding each received signal using appropriate decoding logic. In some embodiments, non-coherent correlation-based decoding may be used, which may provide good robustness to Doppler shift. The processing system may have access to information representative of a time of transmission of each signal. The range data may thus be determined using one or more times of transmission, e.g. by subtracting a time of arrival of each signal from a corresponding estimated or known time of transmission. The speed of the signals (e.g. assumed or measured) may then be used to calculate distance values from the times of flight. References to distances and ranges herein may refer to line-of-sight distances, or they may refer to total path lengths, e.g. in situations where there is reflection or diffraction.

Position estimates may be determined repeatedly, e.g. in order to track the mobile device over time, by repeating some or all of the steps disclosed herein at intervals.

The position estimate may be determined in one dimension, two dimensions or three dimensions. The position estimate may be stored or output or processed further.

The step-distance data may be processed in various ways to determine a step-data-based position estimate for the mobile device. The step-data-based position estimate may be determined using an initial position estimate, determined from an earlier solving of the optimisation problem. This initial position estimate may then be updated based on the time series of step-data-based distances. In some embodiments, relative or absolute heading data for the mobile device may be used when determining the step-data-based position estimate. The heading data may be determined using a gyroscope and/or accelerometer and/or compass of the mobile device. It may be received from an inertial measurement unit (IMU) of the mobile device. The heading data may be combined with the step-distance data to determine a motion vector, or series of motion vectors, which may be used to determine one or more step-data-based position estimates.

The step-detection algorithm may determine step-distance data in various ways. However, in some preferred embodiments, a periodic function is fitted to a time series of acceleration values in the acceleration data to determine a characteristic frequency, which may be representative of a step (e.g. walking or running) frequency of the person carrying the mobile device. In some embodiments, the step-distance data is determined with a fractional resolution, allowing it to be determined multiple times within one step. This can allow for highly responsive tracking, as step movement can be used even before a full step has completed.

In particular, some embodiments may comprise receiving first acceleration data, determined using an accelerometer of the mobile device, representative of a movement of the mobile device as it is carried by a person, the first acceleration data comprising a time series of first acceleration values; and fitting a periodic function to the time series of acceleration values to determine a characteristic frequency. They may comprise receiving second acceleration data, determined using the accelerometer of the mobile device, representative of a further movement of the mobile device, the second acceleration data comprising one or more second acceleration values. They may comprise determining, from the characteristic frequency and the second acceleration data, a step-completeness value representative of a non-integer fraction of a step taken by the person carrying the mobile device. They may comprise processing the step-completeness value and a step length parameter for determining a distance travelled by the mobile device due to the further movement.

This idea is believed to be novel in its own right.

Thus, from another aspect, the invention provides a system for determining a distance travelled by a mobile device, the system comprising a processing system configured to:
receive first acceleration data, determined using an accelerometer of the mobile device, representative of a movement of the mobile device as it is carried by a person, the first acceleration data comprising a time series of first acceleration values;
fit a periodic function to the time series of first acceleration values to determine a characteristic frequency;
receive second acceleration data, determined using the accelerometer of the mobile device, representative of a further movement of the mobile device, the second acceleration data comprising one or more second acceleration values;
determine, from the characteristic frequency and the second acceleration data, a step-completeness value representative of a non-integer fraction of a step taken by the person carrying the mobile device; and
process the step-completeness value and a step length parameter for determining a distance travelled by the mobile device due to the further movement.

From a further aspect, the invention provides a method of determining a distance travelled by a mobile device, the method comprising:
receiving first acceleration data, determined using an accelerometer of the mobile device, representative of a movement of the mobile device as it is carried by a person, the first acceleration data comprising a time series of first acceleration values;

fitting a periodic function to the time series of first acceleration values to determine a characteristic frequency;

receiving second acceleration data, determined using the accelerometer of the mobile device, representative of a further movement of the mobile device, the second acceleration data comprising one or more second acceleration values;

determining, from the characteristic frequency and the second acceleration data, a step-completeness value representative of a non-integer fraction of a step taken by the person carrying the mobile device; and processing the step-completeness value and a step length parameter for determining a distance travelled by the mobile device due to the further movement.

From another aspect, the invention provides a computer program comprising instructions which, when executed on a processing system, cause the processing system to:

receive first acceleration data, determined using an accelerometer of a mobile device, representative of a movement of the mobile device as it is carried by a person, the first acceleration data comprising a time series of first acceleration values;

fit a periodic function to the time series of first acceleration values to determine a characteristic frequency;

receive second acceleration data, determined using the accelerometer of the mobile device, representative of a further movement of the mobile device, the second acceleration data comprising one or more second acceleration values;

determine, from the characteristic frequency and the second acceleration data, a step-completeness value representative of a non-integer fraction of a step taken by the person carrying the mobile device; and process the step-completeness value and a step length parameter for determining a distance travelled by the mobile device due to the further movement.

Thus it will be seen that, in accordance with embodiments of these aspects, a distance travelled by the mobile device as a result of its movement as it is carried by a person can be determined, using data from an accelerometer of the mobile device, with a resolution finer than the person's step length.

Features of these aspects and embodiments may be used in embodiments of the preceding aspects. In particular, steps of these aspects may be used when performing the aforesaid step of processing acceleration data in a step-detection algorithm to determine step-distance data representative of a time series of step-data-based distances travelled by the mobile device. Conversely, any features of the preceding aspects or embodiments may be features of embodiments of these aspects.

When the person carrying the mobile device is walking or running, the mobile device (and hence the accelerometer of the mobile device) is in a dynamic state. Such movement by the person carrying the mobile device will be periodic in nature, due to a repeating cycle of steps taken by the person, such that acceleration signals received by the accelerometer contain period fluctuations.

By fitting a periodic function (such as a sine or cosine function) to the acceleration data, a characteristic frequency associated with the movement of the person carrying the mobile device can be determined. This frequency reflects the periodic nature of the movement of the device, and hence of the person carrying the mobile device. This characteristic frequency can be used, in combination with subsequent acceleration data, to track distance travelled.

The step-completeness value, representative of a fraction of a step taken by the person carrying the mobile device (e.g. how far into a given step the person is), is determined. The step-completeness value can then be used in combination with a step length parameter to determine a distance travelled by the mobile device.

The step length parameter may represent a typical or recent step (i.e. stride) length of the person carrying the mobile device. It may, for example, be in the range 70 cm to 80 cm. It be a preconfigured value or it may be determined by the processing system—e.g. by a calibration process that uses positioning data determined using signals exchanged between the mobile device and one or more external units, such as radio or acoustic beacons.

Acceleration data may be received from the accelerometer of the mobile device at intervals, which may be regular intervals, i.e. such that acceleration data is received at a uniform rate. The acceleration data may be sampled by the processing system at a rate based on an update frequency of the accelerometer. In some embodiments, the accelerometer is contained in an inertial measurement unit (IMU) of the mobile device.

The processing system may be configured to filter at least the first acceleration data before fitting the periodic function. Preferably, the filter is a low pass filter applied in the frequency domain. It may have a threshold frequency that corresponds to an expected minimum frequency of steps taken by the person carrying the mobile device. In this way, spurious data from the accelerometer can be discarded before the acceleration data is fitted with the periodic function.

In some embodiments, the acceleration values comprise acceleration components in one, two or three directions. In such embodiments, a filter may be applied to each of the acceleration components individually. Preferably, the acceleration values comprise acceleration components in three directions, for example corresponding to the three axes of a three-axis accelerometer.

The acceleration values may include a contribution due to the effect of gravity on the mobile device. In some embodiments, at least the first acceleration values are processed in order to remove the contribution due to the effect of gravity on the mobile device from the acceleration values before the periodic function is fitted to the first acceleration data. In some embodiments, removing the contribution due to the effect of gravity comprises calculating an acceleration value for the effect of gravity on the mobile device, and subtracting this gravitational acceleration value from each of the first and/or second acceleration values determined using the accelerometer of the mobile device.

In some embodiments, at least the first acceleration values are compared to a threshold acceleration value before being fitted using the periodic function. Acceleration values having a magnitude lower than the threshold acceleration value may be discarded before the first acceleration values are fitted using the periodic function. In some embodiments, the threshold acceleration value may equal 1.0 (to one significant figure) or 0.98 $m/s^2$ (to two significant figures).

In some embodiments, in order to hasten the fitting of the periodic function, an initial value for the characteristic frequency may be set. The initial value may be set to approximate the average walking frequency of the person. This may be preconfigured, or the processing system may be configured to determine this empirically, e.g. by monitoring the acceleration data over time. In some embodiments, an initial value of the characteristic frequency may be between 0.5 Hz and 2 Hz.

In some embodiments, determining the step-completeness value comprises calculating an acceleration parameter from the periodic function. It may comprise determining the derivative of the acceleration parameter. It may comprise performing a complex number transformation, in which the real part of a complex number depends on the magnitude of the acceleration parameter (e.g. equaling it), and the imaginary part of the complex number depends on the derivative of the acceleration parameter (e.g. equaling it, optionally multiplied by a scale factor). A phase value may then be calculated by evaluating the phase of the complex number. This phase value may be the step-completeness value. In some embodiments, calculating the acceleration parameter uses the second acceleration data; it may comprise evaluating the periodic function for a time instant associated with the second acceleration data.

The processing system may determine a time series of distances travelled by the mobile device at intervals, which may be at regular intervals. These intervals may be shorter than a step duration of the person, such that a plurality of step-completeness values are determined over each step.

When distances are determined more frequently than the characteristic frequency of the step movement, the fraction may be a proper fraction. If distances are determined less frequently, the fraction may be an improper fraction—i.e. comprising an integer part and a fractional part. Of course, on occasions, the step-completeness value may take an integer value, but in general it will comprise a non-zero fractional part, and the processing system is configured to determine the value of such a fractional part.

In some embodiments, the distance travelled by the mobile device due to the further movement of the person carrying the mobile device may be determined by calculating the product of the step completeness value and the step length parameter.

In some embodiments, successive values for the distance travelled by the mobile device are calculated in response to receiving second acceleration data from the accelerometer due to additional movement of the mobile device.

In some embodiments, an accumulated distance travelled by the mobile device may be determined. This may comprise calculating a sum of successive values of distances travelled by the mobile device over time.

In some embodiments a sum of successive step-completeness values may be calculated, to determine a total fractional step count, representative of an accumulated number of steps taken by the person carrying the mobile device. The total fractional step count may comprise an integer part and a fractional part. An accumulated distance travelled by the mobile device may be determined using the total fractional step count and the step length parameter. Preferably, the product of the total fractional step count and the step length parameter is calculated to determine the accumulated distance travelled by the mobile device.

A time series of values of total fractional step count values may be determined using step-completeness values calculated at successive times. These values may be filtered, before being used to determine a time series of accumulated distances travelled by the mobile device. They may be stored in a memory of the processing system (e.g. a memory of the mobile device). They may be smoothed—e.g. using linear regression. In one set of embodiments, a linear regression operation may be applied to successive sliding time windows of the time series of total fractional step count values, over time, to generate a series of linear-regression values, which may be used to determine the accumulated distances. An augmented value for the characteristic frequency may be determined from the slope of such a linear regression operation. In some embodiments, the augmented value of the characteristic frequency may be set as a maximum allowable frequency value when fitting the periodic function to the time series of acceleration values. This may prevent unrealistic frequency values being calculated during the fitting operation.

In any of the aspects or embodiments disclosed herein, the processing system may comprise processing circuitry and/or one or more processors and memory storing software for execution by the one or more processors. The processing circuitry and/or software may implement any of the features disclosed herein.

The mobile device may comprise some or all of the processing system. This may be particularly appropriate when the mobile device has a display screen and powerful processor, for example if it is a smartphone. In such embodiments, the mobile device may be arranged to calculate and store its own position estimate. This may avoid the need to communicate data from the mobile device to be processed elsewhere—e.g., on a remote server.

However, in one set of embodiments, one or more external units may comprise some or all of the processing system, while in another set of embodiments, some or all of the processing system may be external to both the mobile device and the external unit—e.g. comprising one or more external servers. This may be advantageous in reducing the processing requirement on the mobile device, which can reduce its cost and power consumption, even after accounting for the need to transmit data from the mobile device (e.g., by radio). This may be helpful when the mobile device is battery powered.

The processing system may be split across multiple processors or multiple locations, or both. The mobile device may be configured to transmit data representative of the received signal, or information derived therefrom, to a remote processing unit. The mobile device and/or an external unit may comprise a wired or wireless transmitter, such as a radio transmitter, for transmitting information relating to a received or transmitted signal.

In some embodiments, the mobile device may comprise only some parts, or even none, of the processing system, while other parts of the processing system may reside in one or more other units, such as on a remote computer or server, which may form part of the positioning system. The mobile device may comprise a radio, optical, or other transmitter—e.g., a Bluetooth, WiFi or cellular network transmitter.

The mobile device may be a mobile telephone (cellphone) or smartphone or tablet or other portable computing device. Alternatively, it may be an asset tag without any complex graphical user interface. It may be carried by the person in various ways—e.g., held in the person's hand; in a bag worn or held by the person; fastened to, or in a pocket of, a garment worn by the person; on a lanyard around the person's neck, etc.

The processing system and/or each external unit and/or the mobile device may comprise any one or more of processors, DSPs, ASICs, FPGAs for carrying out the described steps. It may comprise memory for storing data and/or for storing software instructions to be executed by a processor, DSP or FPGA. It may comprise any other appropriate analogue or digital components, including power supplies, oscillators, ADCs, DACs, RAM, flash memory, network interfaces, user interfaces, etc. It may be a single unit or may comprise a plurality of processing units, which may be arranged to communicate by one or more wired or wireless links.

The processing system may further comprise data storage and/or a display and/or a data connection, and may be configured to store and/or display and/or communicate electronically information relating to the estimated position of the mobile device. The system may, for example, be arranged to indicate the position of the mobile device on a map or plan of a building or the environment.

The system may comprise a radio transmitter arranged to transmit timing information to each external unit and/or the mobile device. Each external unit and mobile device may be synchronised so that time of arrival information can be used for positioning, instead of time difference of arrival. This may require fewer external units to be in range of the mobile device for accurate positioning.

Computer programs as disclosed herein may be transitory (e.g. signals) or they may be stored on a non-transitory computer-readable storage medium (e.g. a hard drive or solid-state memory).

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which:

FIGS. 5a and 5b illustrate an accumulation of steps using the step detection algorithm, and the associated acceleration measurements determined by the mobile device;

DETAILED DESCRIPTION

Figure 1:
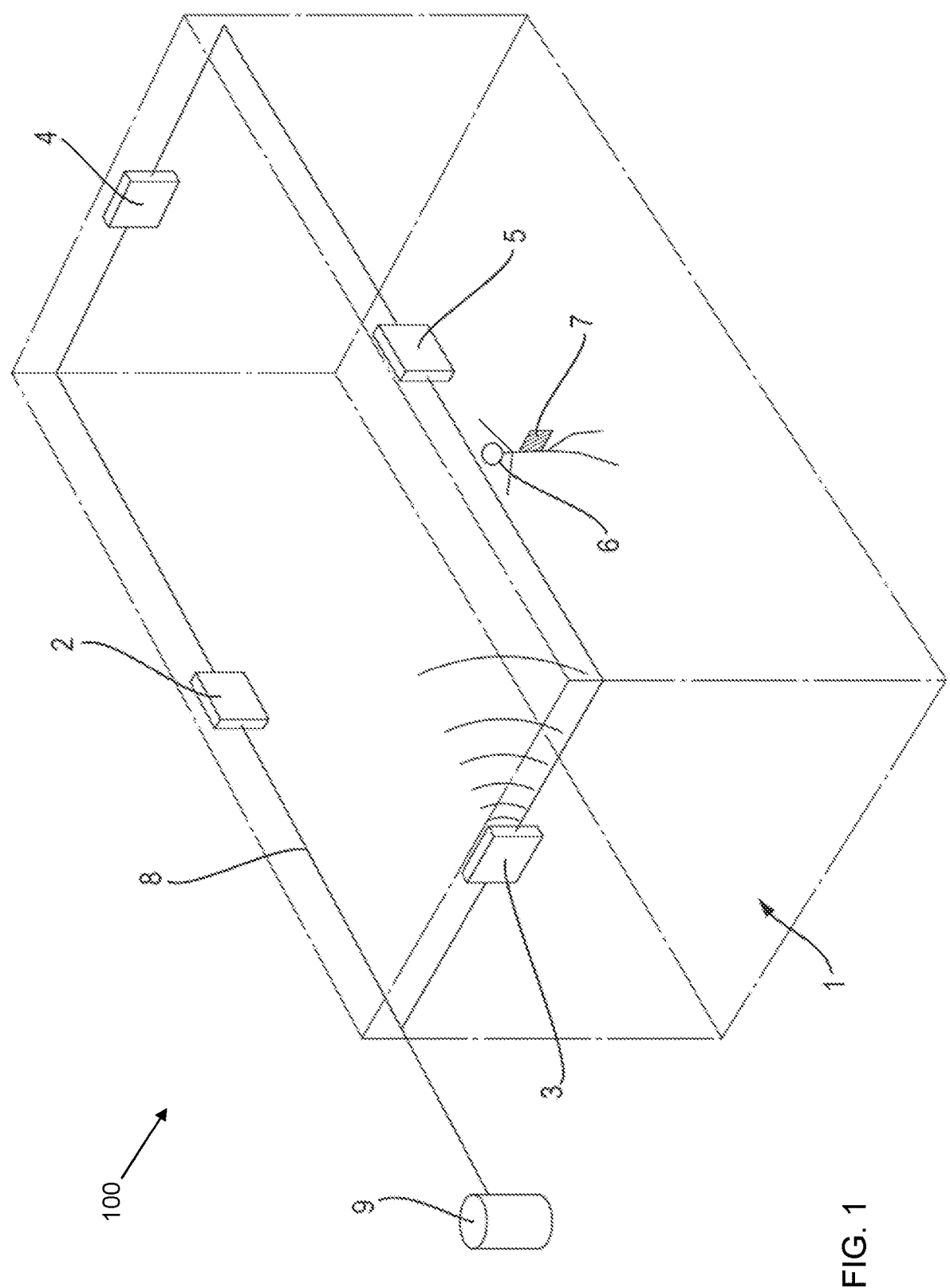
FIG. 1 is a perspective diagram of a positioning system embodying the invention.

FIG. 1 shows part of a positioning system 100 that may be used in, for example, a shopping mall in order to determine the locations of shoppers within the shopping mall. Of course, this is just one example environment, and the positioning system could also be used in warehouses, hospitals, domestic homes, vehicles, etc.

FIG. 1 shows a room 1, to the walls of which are affixed four static transmitter units 2, 3, 4, 5. A person 6 in the room is carrying a mobile device 7. A network cable 8 connects each transmitter unit 2, 3, 4, 5 to a server 9, which is typically located in another room or in another building. These components cooperate to provide a positioning system 100, capable of estimating the three-dimensional location of the mobile device 7 within the room 1. In practice, the system 100 may have further similar transmitter units, installed throughout a building or series of rooms, and a plurality of similar mobile receiver units attached to, or incorporated into, people, animals, vehicles, robots, stock, equipment, etc.

Figure 2:
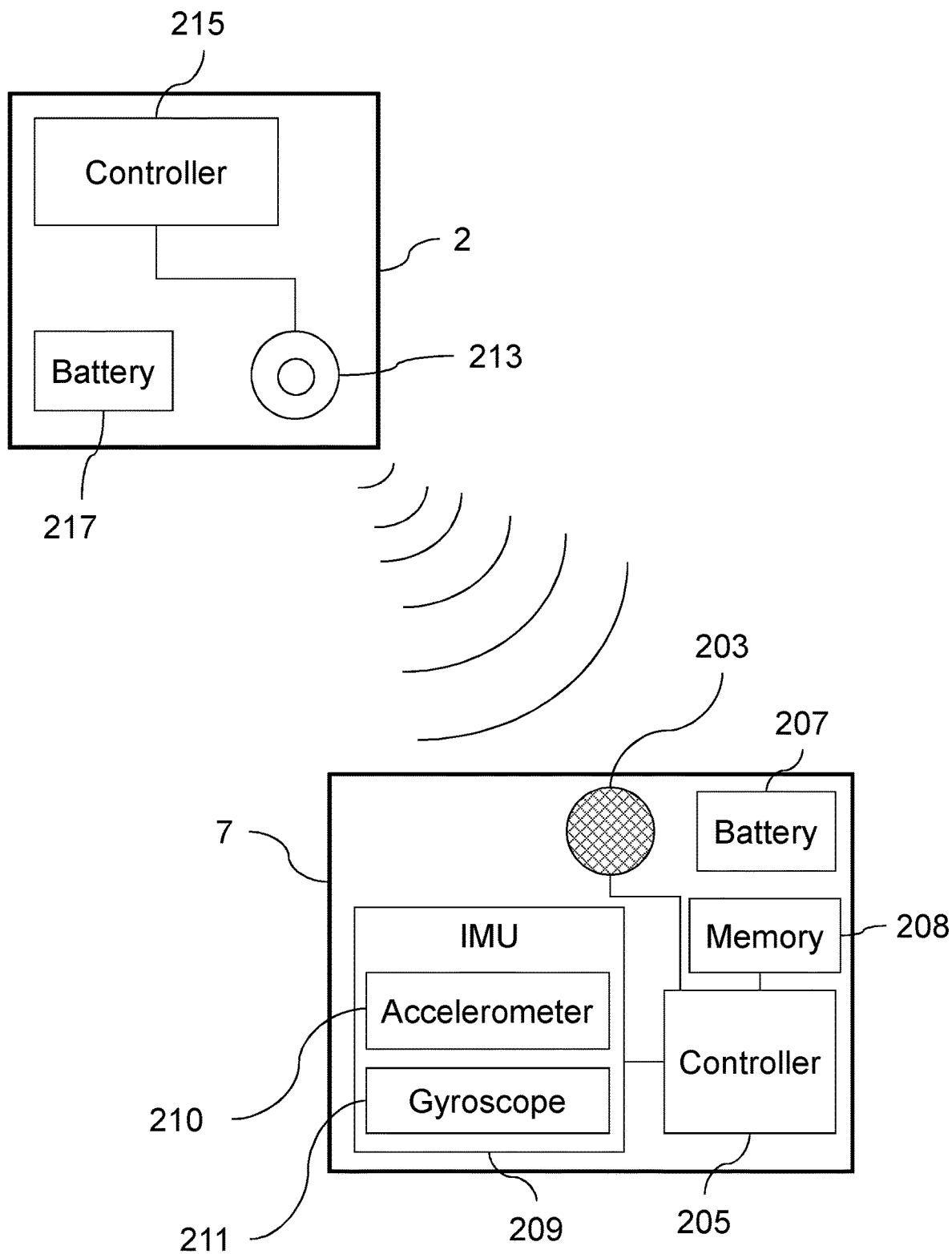
FIG. 2 is a schematic drawing of a static transmitter unit and a mobile device of the positioning system.

FIG. 2 shows more detail of the mobile device 7 and a representative one 2 of the transmitter units 2, 3, 4, 5. The transmitter unit 2 has an ultrasonic sounder 213, a controller 215 for causing the transmitter device 2 to transmit ultrasonic signals, and a battery 217 for supplying power to the transmitter unit 2. The mobile device 7 has a microphone 203 capable of receiving ultrasonic signals from the transmitter unit 2, a microcontroller unit (MCU) 205, a battery 207 for powering the mobile device 7, a separate memory 208, and an inertial measurement unit (IMU) 209.

The inertial measurement unit 209 of the mobile device 7 comprises an accelerometer 210 and a gyroscope 211, with associated control circuitry. It is configured to sense acceleration along three axes, and rotation around three axes.

The microcontroller 205 executes software instructions stored in a memory of the microcontroller 205 or on the off-chip memory 208. It is configured to receive analogue or digital electronic signals representing acoustic signals received at the microphone 203, as well as rotation and acceleration signals from the IMU 209, and to process these signals.

The transmitter units 2, 3, 4, 5, and the mobile device 7 may have further standard electronic components such as radio transceivers, wired-network interfaces, display screens, buttons, etc. In some embodiments, the mobile device 7 is a tablet or mobile telephone (cellphone) such as an Apple™ or Android™ smart phone.

The microcontroller units 205, 215 can include one or more processors, DSPs, ASICs and/or FPGAs. They can include memory for storing data and/or for storing software instructions to be executed by a processor or DSP. The microcontroller 205, 215 or units 2, 7 more generally can include any other appropriate analogue or digital components, including oscillators, ADCs, DACs, RAM, flash memory, etc.

The transmitter units 2, 3, 4, 5 are configured to transmit, at regular intervals (e.g. every one second), a locating signal comprising a signature unique to that transmitter unit. The transmissions may be coordinated, e.g. by the server 9, to minimise negative interference between nearby transmitter units. The transmitted signals may be received at the microphone 203 of the mobile device 7. The received signals may then be demodulated and processed by the microcontroller unit 205 of the mobile device 7 to identify signatures that have been transmitted by transmitter units 2-5 within audible range of the mobile device 7 and to determine one or more times of arrival for each signature.

The receiver unit 7 uses an internal clock to timestamp the received signatures. The receiver unit 7 may be synchronised with each of the transmitter units 2-5 (and optionally with the server 9) and can therefore also calculate a time of flight (TOF) for each signature it receives. Based on the TOF measurement, and the known location of the transmitter units 2-5, a range between the mobile device 7 and the identified transmitter unit may can be determined. By combining three or more TOF measurements from known transmitter locations, the position of the mobile receiver unit 7 can be determined using geometric principles of trilateration (also referred to as multilateration). If the receiver unit 7 is not synchronised with the transmitters 2-5, a time difference of flight (TDOF) method can still be used to determine the position of the mobile device 7; however, in this case, more transmitter units 2-5 may have to be in range of the mobile device 7 to get an accurate position estimate.

New TOF distances may be obtained repeatedly over time, which can result in an over-specified problem. Individual measurements may be inaccurate, e.g. due to noise, and can also become out-of-date when the mobile device 7 is in motion. One approach that the microcontroller 205 uses to estimate the position of the mobile device 7 is to use a minimization algorithm to generate a position estimate, r, of the mobile device 7 using a cost function, $J_1$, with the following form:

$$J_1(r; r_i, R_i) = \frac{\sum w_i((r - r_i)^2 - R_i^2)}{\sum \text{rel\_w}_i}$$

where:
the sums are over all the transmitter units, i, from which signals have been received,
r is a vector representing the position estimate to be determined for the mobile device 7 (in three-dimensional space or two-dimensionally in a horizontal plane),
$r_i$ is the known 2D or 3D position of the transmitter unit i, and
$R_i$ is the latest measured range between the mobile device 7 and the transmitter unit i.

Each of the transmitter units 2, 3, 4, 5 i is given a weighting, $w_i$. The weight, $w_i$, may include an absolute component, e.g. which depends on the variance (or alternative error term) of the measurements for a single transmitter unit i. It may also optionally include a relative component, $\text{rel\_w}_i$, which may represent a confidence in the reliability of a measurement from a transmitter unit i relative to the other transmitter units; this may, for example, depend on the age of the measurement (i.e. with a lower relative confidence score being assigned to older measurements).

The cost function $J_1$ is normalised for the relative weights, $\text{rel\_w}_i$, but not for the absolute weight components. This is because the absolute component (e.g. the variance in measurements) indicates how reliable each transmitter unit is, so should be taken into account globally in the cost function, whereas the relative weights only indicate which transmitter units are trusted more, relative to the other transmitter units, not the reliability of the measurements in an absolute sense.

In this way, the positioning system 100 shown in FIG. 1 may be used to determine the position of the mobile device 7 within rooms of a building in which static transmitter units 2, 3, 4, 5 are located.

While this approach may be used to estimate the position of the mobile device 7, the applicant has recognised that, if an initial position estimate of the mobile device 7 is known, such as from ultrasound-signal TOF data as described above, subsequent position estimates can be improved using additional data obtained from the inertial measurement unit (IMU) 209 of the mobile device 7. IMU data associated with the motion of the mobile device 7 may be processed using pedestrian dead reckoning techniques to determine additional range estimates, which may be combined with the position data determined based on ultrasound TOF measurements to improve the position estimate of the mobile device 7. As long as an initial positon estimate of the device is known, IMU data can also be used to determine an updated position of the mobile device 7 even when it is out of range of the transmitter units 2, 3, 4, 5.

Thus a first position estimate for the mobile device 7 may be generated when in range of the transmitter units 2, 3, 4, 5 using TOF measurements as described above, and updated position estimates of the mobile device 7 may be determined using one or more further range estimates determined from data output by the IMU 209.

In order to determine a range estimate based on measurements by the IMU 209, data from the accelerometer 210 and the gyroscope 211 of the IMU 209 may be processed using a step detection algorithm as will be described in the following.

Step Detection Algorithm Outline

When the mobile device 7 is being carried by a walking person 6, the IMU 209 is in a dynamic state as a result of the walking motion, and this motion can be detected by the accelerometer 210 of the IMU 209 through periodic fluctuations in the acceleration signal. The applicant has recognised that due to the periodic nature of the acceleration changes, if the contribution due to gravity is removed, the acceleration signal associated with a walking motion can be well approximated by a sine wave, characterised by a particular walking frequency, and that this can be tracked using a step detection algorithm, executed by the microcontroller 205 of the mobile device 7.

The step detection algorithm disclosed herein can be used to determine the number of steps taken by a user 6 by approximating the norm of the gravity-free acceleration vector as a sine wave characterised by a walking frequency $f_\omega$. A left-leg step and a right-leg step are here considered two individual steps, and the walking frequency is the frequency of these individual steps.

Figure 3:
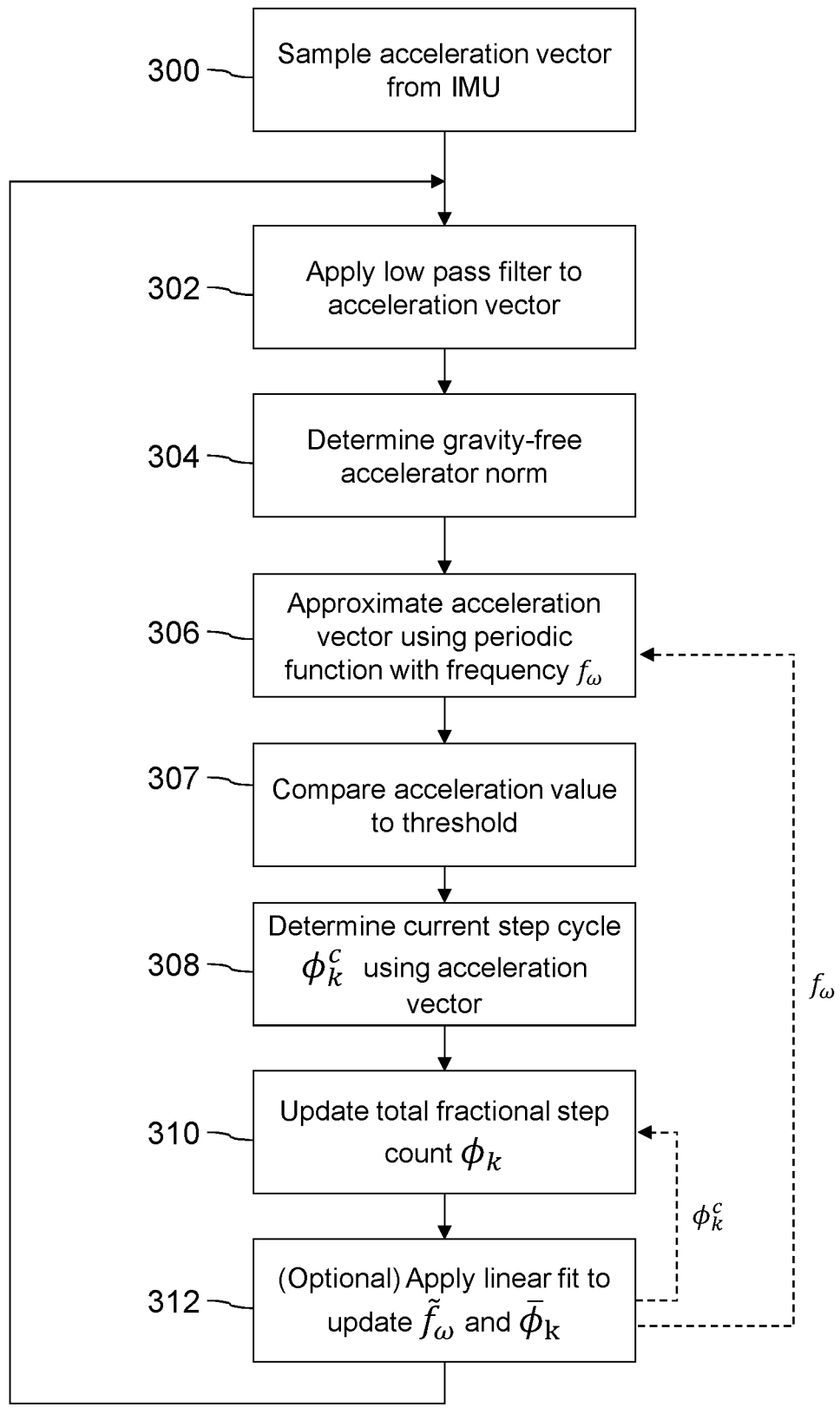
FIG. 3 is a flow chart showing operations carried out by a step detection algorithm embodying the invention.

FIG. 3 shows a process flow diagram depicting the steps taken by the step detection algorithm.

In step 300, the microcontroller 205 samples acceleration data (in the form of an acceleration vector) measured by the accelerometer 210 of the IMU 209 to be processed using the step detection algorithm. The acceleration vector may be sampled at regular time intervals (e.g. every 30 ms), or sampling may be carried out whenever new data is received at the microcontroller 205 from by the IMU 209 (i.e. based on the update frequency of the IMU 209).

In step 302, the step detection algorithm applies a low pass filter to the acceleration vector measured by the accelerometer 210 of the mobile device 7.

The power spectral density of the acceleration vector is approximately zero at lower frequencies, otherwise the walking user 6 would be in constant acceleration. Except for during transition periods (i.e., at the start of a walking motion), when true acceleration or deceleration occurs, a lower bound on the walking frequency can therefore be applied in the frequency domain, for example using a low pass filter. The lower bound on frequency can be determined by considering the average duration of each step taken by a person 6 carrying the mobile device 7. Starting from an initial position, the walking motion of the person 6 carrying the mobile device 7 can be described by a step cycle consisting of two steps (i.e. left foot then right foot). At the end of each cycle, the person's posture returns to a state approximately equivalent to that of the person's initial state.

As a result, the acceleration profile measured by the IMU 209 approximately repeats every step cycle, i.e. every two steps. A lower bound value for the walking frequency $f_\omega$ can therefore be set as the reciprocal of half the duration of the step cycle. However, lower frequencies might still occur in practice due to slight changes in walking velocity and sensor movements unrelated to the walking motion.

A low pass filter is applied along each of the three accelerometer axes (referred to in the following as x, y and z axes) to determine acceleration components $a_x$, $a_y$, $a_z$ as a function of time t.

In step 304, by calculating the norm of the acceleration value along each axis, and removing the local gravity contribution, g, from the measured acceleration vector, the gravity-free accelerator norm, $a_n(t)$ is determined.

The local gravity contribution can be separated into a magnitude scalar $g_m$ and a unit vector $\gamma$ (referred to in the following as the gravity vector), represented in the local frame of the device 7, that relates the device's frame of reference to the horizontal plane of the North-East-Down (NED)-frame in local tangent plane coordinates. The gravity-free accelerator norm, $a_n(t)$ can therefore be given by $$a_n(t) = \sqrt{a_x(t)^2 + a_y(t)^2 + a_z(t)^2} - g_m \cdot \gamma$$

Figure 4:
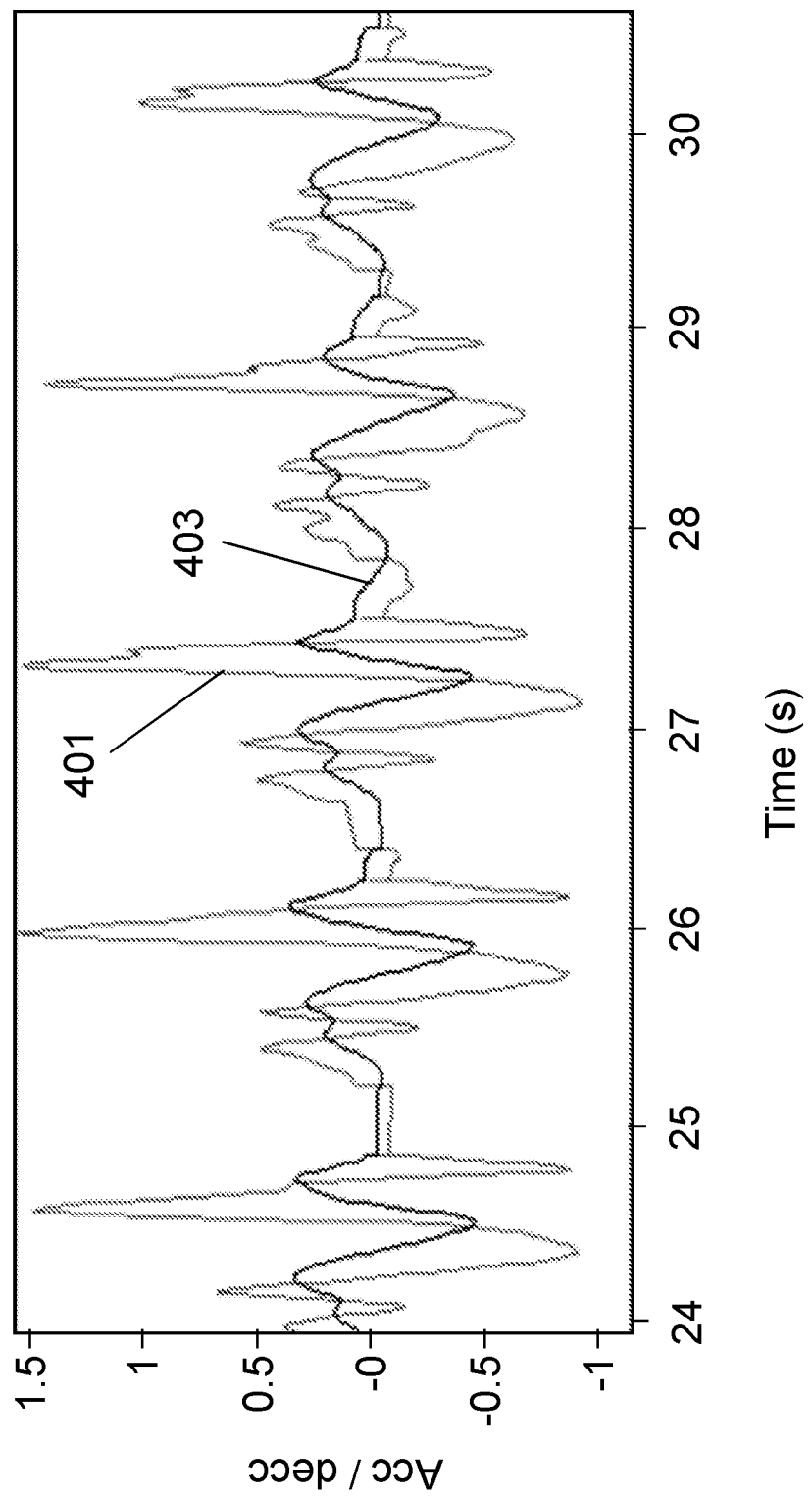
FIG. 4 is a plot of acceleration measurements determined by the mobile device as part of the step detection algorithm.

FIG. 4 shows an example of the gravity-free accelerometer norm 401 (and its derivative with respect to time 403), over time, determined using acceleration measurements from the accelerometer 210 of a mobile device 7 being carried by a walking person. It can be seen in FIG. 4 that the gravity-free accelerometer norm is periodic in nature, and can hence be approximated using a periodic function, e.g. a sine function.

This approximation is performed in step 306, using the function $$a_n(t) \approx A \sin(2\pi f_\omega t)$$

where $f_\omega$ is an estimated walking frequency and A is an unknown amplitude. The estimated walking frequency may initially be set at a value close to a typical average walking frequency of the person 6 carrying the mobile device 7 (typically between 0.5 and 2 Hz), but can be updated over time as more acceleration data is measured by the accelerometer 210 as will be explained in the following.

The derivative of the gravity-free accelerometer norm, $\dot{a}_n$, is also periodic in nature, and can be approximated by the cosine function $$\dot{a}_n(t) \approx 2\pi f_\omega A \cos(2\pi f_\omega t)$$

which can be scaled towards the approximated gravity-free accelerator norm to ensure a smooth gradient in the following calculations as $$\dot{a}^*(t) = \frac{1}{2\pi f_\omega} \dot{a}(t)$$

The magnitude of the gravity-free accelerator norm, $\dot{a}_n$ is compared to a threshold acceleration value (e.g. 0.98 m/s²) in step 307. If the magnitude of the gravity-free accelerator norm, $\dot{a}_n$ is found to be below the threshold value, the acceleration measurement is not processed using the step detection algorithm.

In step 308, for each acceleration measurement, $a_k = a(t_k)$, recorded by the accelerometer 210, a step completeness estimate, $\phi_k^c$, is calculated using a complex number transformation, where the real part of the complex number is taken to be the magnitude of the acceleration, $a_n$, and the imaginary part of the complex number is given by the scaled derivative of the acceleration, $\dot{a}^*$. A phase value, corresponding to the step completeness estimate, $\phi_k^c$, is then calculated using the two-argument arctangent function:

$$\phi_k^c = \frac{1}{2\pi} \arctan2\left(\frac{a_k}{\dot{a}_k^*}\right)$$

which provides a step completeness estimate constrained to the interval [−0.5, 0.5]. The step completeness estimate is a value which represents the fraction of the step taken by the person 6 carrying the mobile device 7 at the time at which the acceleration measurement is recorded by the accelerometer 210.

Having calculated the step completeness estimate associated with a given acceleration measurement, the distance travelled by the person 6 carrying the mobile device 7 over multiple accelerometer measurements can be estimated by calculating a total fractional step count, $\phi_k$, representing an accumulation of steps having both an integer component and a fractional component.

The total fractional step count, calculated in step 310, is an accumulated value updated using the step completeness estimate, $\phi_k^c$ calculated in response to each accelerometer measurement, i.e. the total fractional step count can be calculated according to:

$$\phi_k = \phi_k^c - [\phi_k^c - \phi_{k-1}] \quad (1)$$

where $\phi_{k-1}$ is the value of the total fractional step count calculated in response to the previous accelerometer measurement, and the square parenthesis indicate rounding to the nearest integer. In this way, the total fractional step count, $\phi_k$, is continually updated as more accelerometer measurements are recorded as the person 6 carrying the mobile device 7 continues to walk or run. In general, the value of the total fractional step count increases as the person 6 continues to take steps, however it is not prohibited from decreasing a small amount in response to certain accelerometer measurements, as shown in FIGS. 5a and 5b.

FIG. 5a shows a second example of the gravity-free accelerometer norm 401 over time, determined using acceleration measurements from the accelerometer 210 of a mobile device 7 being carried by a walking person 6. Its derivative with respect to time is shown as a dashed line 403. The gravity-free accelerometer norm 401 can be seen to be periodic in nature, and, in the example shown, comprises two complete step cycles 405a, 405b, each corresponding to two steps being taken by the walking person 6.

FIG. 5b shows the estimated total fractional step count ($\phi_k$) 409 over the same time frame as FIG. 5a, calculated based on the measured acceleration data using the step detection algorithm, calculated as discrete values at successive time instants (the larger diamonds marks in FIG. 5a). It can be seen in FIG. 5b that, as successive acceleration measurements are recorded, the total fractional step count is generally increasing. It can also be seen that for each step cycle, i.e. for every two steps taken by the user, the total fractional step count increases by approximately two. The total fractional step count shown in FIG. 5b can also be seen to be discontinuous in nature. Such discontinuities in the total fractional step count occur in the event that the gravity-free accelerator norm, $\dot{a}_n$ associated with an accelerometer measurement is found to be below a threshold value, and hence is not processed, as described above in relation to FIG. 3.

Also shown in FIG. 5b, using smaller diamond marks, is a filtered total fractional step count 407. This is calculated from the unfiltered count 409 by applying linear regression over the preceding N samples (for some appropriate integer N, such as N=sample rate×4 seconds), such that each data point of the line 407 is calculated by applying a respective linear fit to the last N data points of the line 409. This process is illustrated further in FIG. 6a.

Figure 6A:
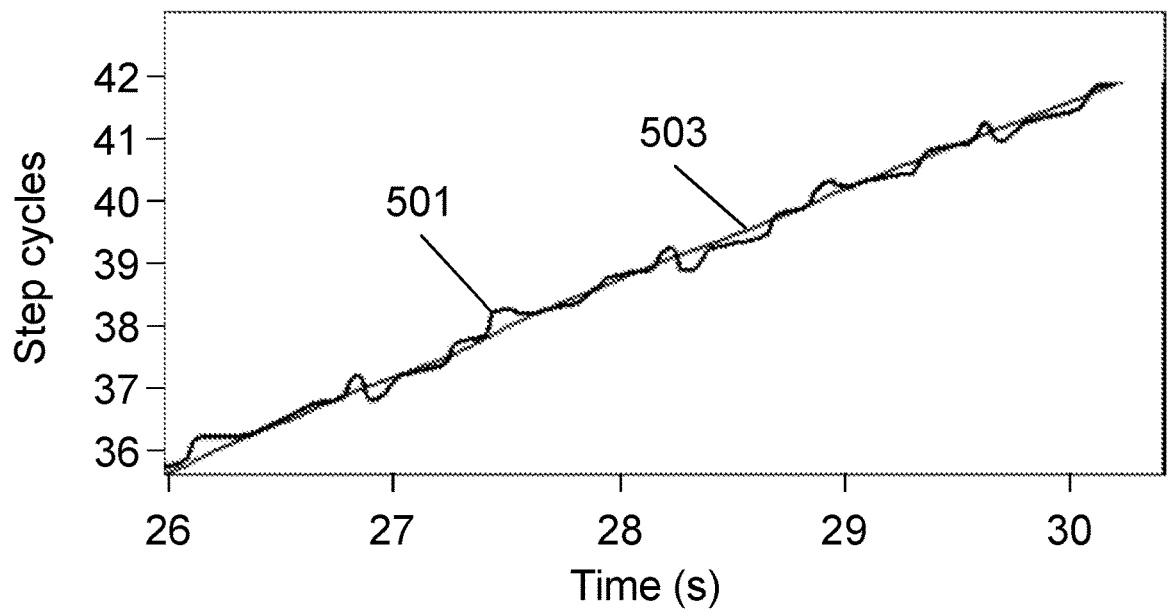
FIGS. 6a and 6b illustrate an accumulation of steps using the step detection algorithm.

FIG. 6a shows a later portion of the total fractional step count, calculated using acceleration vectors $a_k$ at sequential times t, represented by the line 501. This line 501 is a continuation of the line 409 from FIG. 5b.

Also shown in FIG. 6a is a single linear fit line 503 for the total unfiltered fractional step count 501, determined for the latest time point, t=30. This linear fit is calculated by storing the last N values of the total fractional step count $[\phi_i, \phi_{i+1}, \ldots \phi_k]$ (where i=k−N−1) in a buffer in the memory 208 of the mobile device 7, and applying a linear fit (shown as the line 503 in FIG. 6a) to $\phi(t)$ over time using the fitting parameters $\tilde{\phi}_0$ and $\tilde{f}_\omega$, i.e.

$$[\phi_i, \phi_{i+1}, \ldots \phi_k] \rightarrow \phi(t) = \tilde{\phi}_0 + \tilde{f}_\omega(t)$$

In this particular example, N is chosen to span four seconds—i.e. N=sample rate×4 seconds—but other values may be used instead. The value of this single linear-fit line 503, at time t=30, is then used as the value for the filtered total fractional step count 407 for time t=30. Successive points of the filtered count 407 over time are determined similarly, i.e. by performing a corresponding succession of linear-fit operations.

In this way, a series of total fractional step count values may be used to determine an updated walking frequency $\tilde{f}_\omega$ (in optional step 312 of FIG. 3) as the slope of a linear fit, which can be used in the next iteration of the calculation of the total fractional step count. An improved calculation of the step completeness estimate can then be given by $\bar{\phi}_k = \tilde{\phi}_0 + \tilde{f}_\omega t_k$ (where the bar symbol denotes an estimated or predicted value), which may be used as the value of the total fractional step count in the next iteration of calculation of the total fractional step count.

Figure 6B:
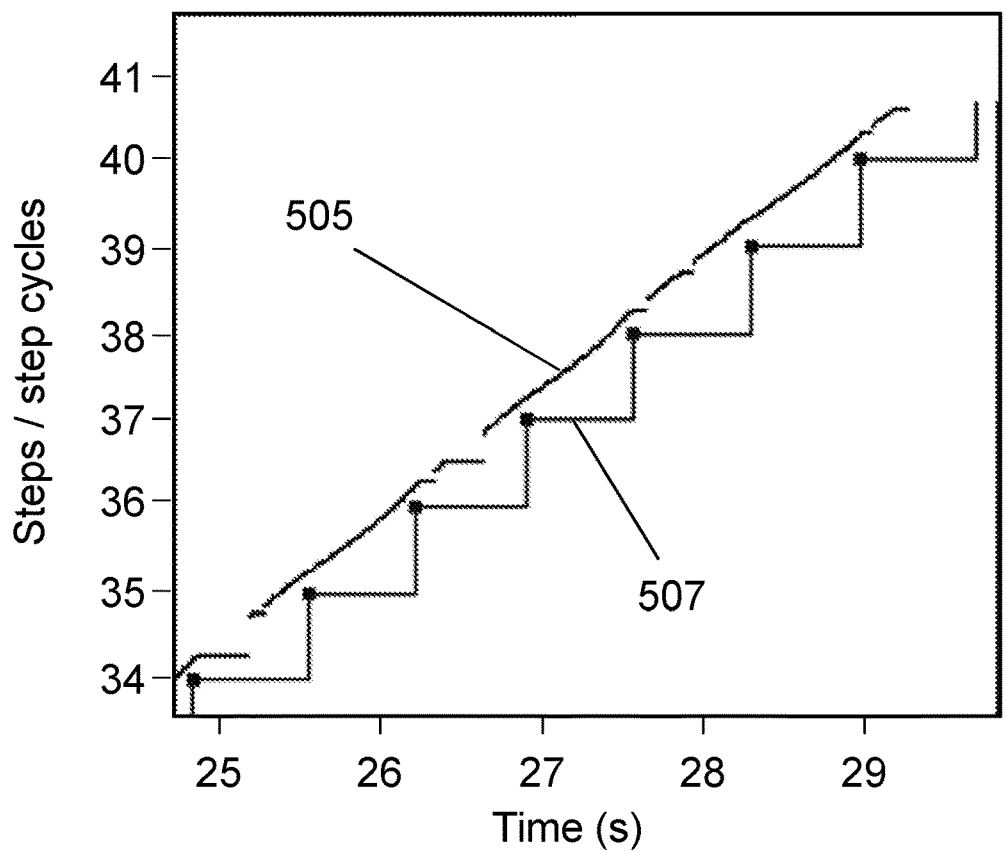

FIG. 6b shows a comparison of a calculated value of the filtered total fractional step count 505 (calculated as described for the filtered count 407 above), determined for a person 6 carrying a mobile device 7 configured to execute the step detection algorithm described above, and a plot 507 of 'true' steps taken by the person 6, as recorded directly using a motion-capture system. The 'true' step is based on movement of the foot of the person 6 immediately before breaking contact with the floor, at which point the 'step' is recorded. Such a motion-capture system would not normally be used in practice; this comparison is provided here, rather, to demonstrate the efficacy of the disclosed step counting methodology. It can be seen in FIG. 6b that, by approximating the acceleration of the mobile device 7 as a periodic function, and applying a continuously-updated linear-fit process to the total fractional step count over time, near real-time or even predictive step estimation can be achieved. This is in contrast to prior art approaches, in which steps are not counted until after the motion has finished.

In some embodiments the step detection algorithm may be further improved by setting appropriate boundary conditions such as limiting the minimum or maximum amplitude based on the detected acceleration (e.g. by setting $A_{max} = \sqrt{a^2 + \dot{a}^2}$), or by setting a maximum value for the estimated walking frequency $\tilde{f}_\omega$ determined using the linear fit.

In order to estimate the distance travelled by the person 6, the total fractional step count, $\phi_k$, is combined with step length data—e.g. multiplied by a standard step length. A default step length may be used, at least initially (e.g. based on the height of the user), or an average step length may be calculated by the device 7 based on external measurements—e.g., by counting the number of steps detected when the mobile device 7 is in range of the ultrasound transmitters 2, 3, 4, 5, and dividing this by the distance travelled as determined by the ultrasound TOF measurements. After an extended walking period, small changes in step length may be estimated by the device 7 from the changes in the acceleration amplitude over time.

By fusing distance estimates determined using the step detection algorithm with heading data determined using gyroscope 211 of the IMU 209, it is possible for the controller 205 to determine an updated position estimate of the person 6 carrying the mobile device 7 after each update from the IMU 209 using a pedestrian dead reckoning approach as will be described further below.

Heading Estimation Outline

In order to estimate the heading of a person 6 carrying the mobile device 7 using gyroscope measurements, it is assumed that the change in the horizontal rotation of the mobile device 7 is equivalent to the change in heading of the person 6 carrying the mobile device 7. This assumption is valid so long as the relative position of the mobile device 7 and the person 6 carrying the mobile device 7 is constant, such as when the mobile device 7 is carried within a pocket, or on the wrist of the person 6. Although the absolute value of the horizontal orientation of the mobile device 7 (i.e. its yaw) may be different to that of the person 6 carrying the mobile device 7, the change in the yaw of the mobile device 7 and in the heading of the person 6 carrying the mobile device 7 coincide. Depending on how it is carried, the mobile device 7 may be subject to certain additional rotations (e.g. due to the motion of the person's leg in the case of the mobile device 7 being held in a pocket), however the overall change in direction corresponds to the change in heading of the person 6 carrying the mobile device 7. In this way, if an initial absolute orientation of the mobile device 7 is known, the heading of the person 6 carrying the mobile device 7 can be determined.

Figure 7:
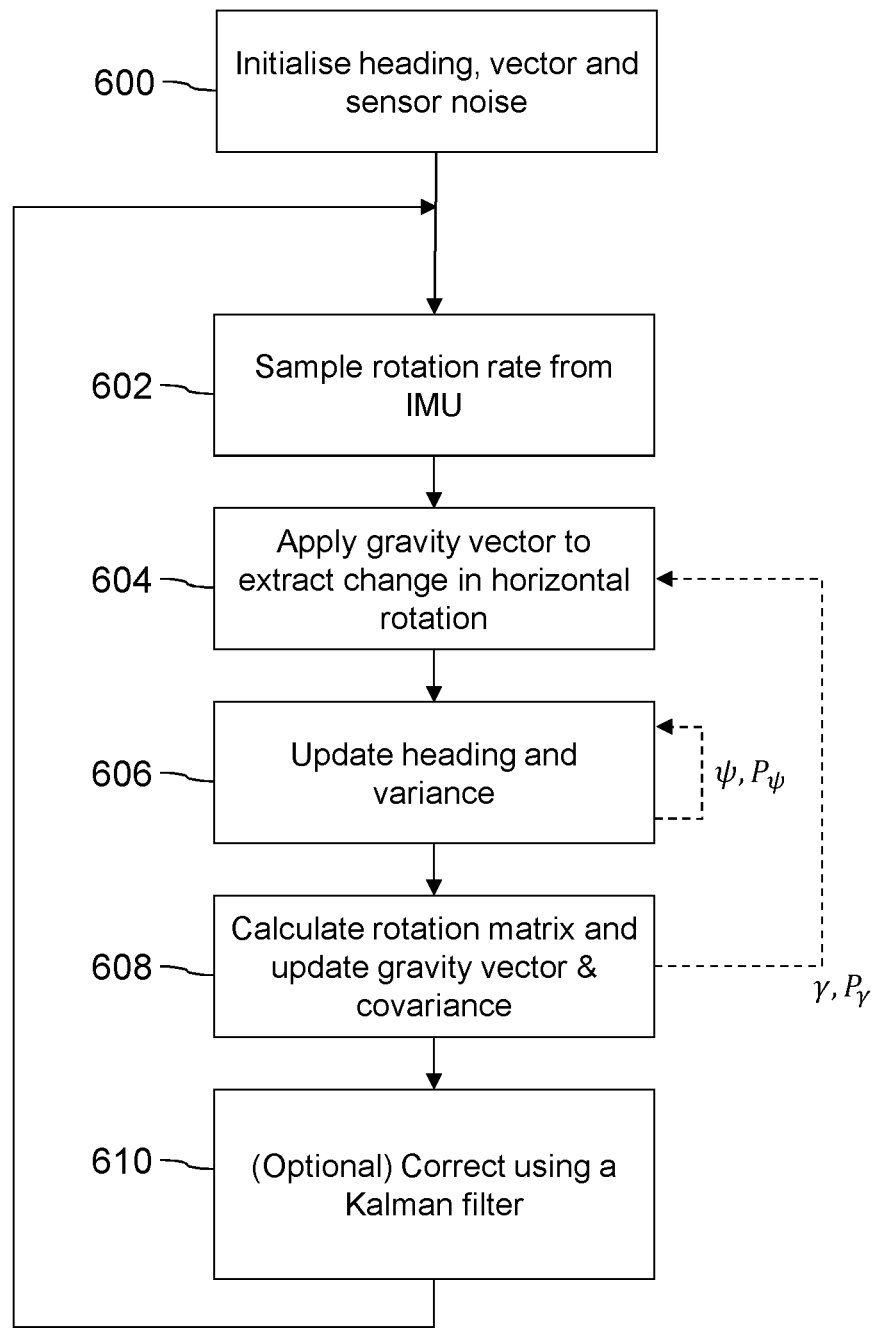
FIG. 7 is a flow chart showing operations carried out by the positioning during a heading estimation process.

FIG. 7 illustrates how the heading of the person 6 carrying the mobile device 7 is measured over time using a heading estimation process. The user heading estimation process is based on determining, for each new measurement, k, received from the IMU 209, the horizontal component of the rotation rate $\omega_k$ as measured by the gyroscope 211, where 'horizontal' indicates the plane orthogonal to the Down vector in the North-East-Down (NED)-frame.

The horizontal rotation rate of the mobile device 7, i.e. the rate at which the yaw of the mobile device 7 changes, can be extracted from the raw gyroscope data by applying the gravity vector at the time of measurement, $\gamma_k$, to each incoming measurement of the rotation rate $\omega_k$. The rate of change of the heading, $\bar{\psi}_k$, of the person 6 carrying the mobile device 7 (i.e. the user heading) can therefore be determined by calculating the dot product of the rotation rate, $\omega_k$ and the gravity vector $\gamma_k$ for each measurement carried out by the IMU 209.

The heading estimation process consists of an initialization phase, a propagation phase and a correction phase, as will be described in the following in relation to FIG. 7.

In the initialisation phase (step 600) an initial user heading $\bar{\psi}_0$ (with variance $P_{\psi_0}$), an initial gravity vector $\bar{\gamma}_0$ (with 3×3 covariance matrix $P_{\gamma_0}$), and a sensor noise term $Q = I_3 \sigma_\omega \Delta t$ are set (where $I_3$ is the 3×3 identity matrix, $\sigma_\omega$ is a vector containing the standard deviation over the three axes of the gyroscope 211, and $\Delta t$ is the interval between successive gyro measurements or IMU updates).

The initial user heading $\bar{\psi}_0$ may be estimated from on a pair of position estimates, taken at different times, which may be determined from an external system, such as by processing ultrasound signals received from the transmitters 2-5, or from a compass, or GPS data, or in any other way. An initial variance $P_{\psi_0}$ (an error term) may be determined similarly, or may be set to infinity if unavailable. In some embodiments, the initial user heading may instead be set to zero if it is sufficient to track only relative heading over time.

In some preferred embodiments, the initial gravity vector $\bar{\gamma}_0$ is determined by averaging data from the accelerometer 210 over a prolonged static period—i.e. a time when the device 7 is stationary. More advanced methods to estimate the gravity vector under dynamic conditions may be used in some embodiments.

The standard deviation of the gyroscope 211 over three axes may be determined empirically, e.g. by the controller 205 analysing the gyroscope output over time.

In the propagation phase, starting in step 602, the microcontroller 205 samples the rotation rate $\omega_k$ measured using the gyroscope 211 of the IMU 209. The heading vector and the gravity vector are then estimated for each incoming rotation rate measurement. This is achieved by applying the gravity vector $\bar{\gamma}_k$ to the measured rotation rate $\omega_k$ and carrying out a forward integration over the time period $\Delta t$ between incoming measurements to determine the change in user heading $\Delta\bar{\psi}_k$, in step 604, i.e.

$$\Delta\bar{\psi}_k = \omega_k^T \bar{\gamma}_k \Delta t$$

The variance of the change in user heading $\Delta\bar{\psi}_k$ is based on the sensor noise Q and the covariance of the gravity vector, and can be given by $$P_{\Delta\psi_k} = \bar{\gamma}_k^T Q \bar{\gamma}_k + \bar{\omega}_k^T P_{\gamma_k} \bar{\omega}_k$$

Having calculated the change in user heading and the variance of this change, an updated heading estimate $\bar{\psi}_{k+1}$ of the person 6 carrying the mobile device 7 and an updated variance in the user heading $P_{\omega_{k+1}}$ are calculated, in step 606, by $$\bar{\psi}_{k+1} = \bar{\psi}_k + \Delta\bar{\psi}_k$$

$$P_{\psi_{k+1}} P_{\psi_k} + P_{\Delta\psi_k} \quad (2)$$

In order to update the gravity vector, $\bar{\gamma}_k$, a rotation matrix, $R_k$ is generated based on the rotation rate $\omega_k$, and is calculated according to:

$$R_k = I + \sin(\|\omega_k\|\Delta t)\left[\frac{\omega_k}{\|\omega_k\|}\right] + 1 - \cos(\|\omega_k\|\Delta t)\left[\frac{\omega_k}{\|\omega_k\|}\right]^2$$

By applying the rotation matrix $R_k$ to the gravity vector, the updated value of the gravity vector, $\bar{\gamma}_{k+1}$, can be determined (in step 608) from the previous value $\bar{\gamma}_k$ as $$\bar{\gamma}_{k+1} = R_k \bar{\gamma}_k \quad (3)$$

and the covariance can be updated as $$P_{\gamma_{k+1}} = R_k P_{\gamma_k} R_k^T + [\bar{\gamma}_k]_x Q [\bar{\gamma}_k]_x^T$$

where $[\bar{\gamma}_k]_x$ is the skew-symmetric matrix of $[\bar{\gamma}_k]$, i.e. for $[\bar{\gamma}_k] = (\bar{\gamma}_{k_1}, \bar{\gamma}_{k_1}, \bar{\gamma}_{k_1})_T$, $[\bar{\gamma}_k]_x$ can be given by:

$$[\bar{\gamma}_k]_x = \begin{bmatrix} 0 & -\bar{\gamma}_{k_3} & \bar{\gamma}_{k_2} \\ \bar{\gamma}_{k_3} & 0 & -\bar{\gamma}_{k_1} \\ -\bar{\gamma}_2 & \bar{\gamma}_{k_1} & 0 \end{bmatrix}$$

In this way, for each new measurement of rotation rate $\omega_k$ output by the gyroscope 211, the user heading estimate $\bar{\psi}_k$ and the gravity vector $\bar{\gamma}_k$ are updated, allowing the heading of the person 6 carrying the mobile device 7 to be determined and updated over time. Updated error terms, in the form of a covariance matrix, are also calculated. Although in the embodiment described in relation to FIG. 7, steps 606 and 608 are shown as being sequential, in some embodiments steps 606 and 608 may instead be run in parallel.

In some embodiments, the estimated user heading and gravity vector may be further adjusted or corrected (in step 610) by combining the updated values with additional data determined by the mobile device 7, using a Kalman filter. For example, heading data may be corrected using magnetometer data (e.g. from a magnetometer in the IMU 209) or from Doppler-shift data obtained from ultrasound signals received by the microphone 203 from one or more transmitter units 2-5.

Similarly, gravity vector corrections may be determined, based on additional data from the accelerometer 210, where low-variance measurements (e.g. obtained during static conditions) can give more accurate results.

In the event that such a correction is used, the 'corrected' user heading and gravity vector values are used in the next iteration of the heading estimation process in place of the original updated values.

Pedestrian Dead Reckoning Model

Having outlined how step data is determined using IMU measurements and the step detection algorithm, and that a user heading estimate $\bar{\psi}_k$ may also be calculated using IMU measurements, the application of this data to a pedestrian dead reckoning (PDR) framework based on an extended Kalman filter (EKF) will be explained in the following.

In the PDR framework, a state vector, x, is defined, which contains 2D position p=(x,y), heading and step parameters. The state vector may be described by $$x = \begin{bmatrix} x \\ y \\ \psi \\ \gamma \\ L \end{bmatrix}$$

where x, y represent the latest estimated 2D position of the mobile device 7, $\psi$ is the latest user heading, $\gamma$ is the gravity vector and L is the step length of the person 6 carrying the mobile device 7.

The controller 205 may store data representing this state vector in the memory 208, and calculate an update to the vector at regular intervals (e.g. every time a new measurement is available from the IMU 208).

An initial estimate of the 2D position may be determined using ultrasound signals received from the transmitter units 2-5, with subsequent values updated using IMU data, as well as further ultrasound signals, as will be described in the following.

Since measurements from the IMU 209 come in at discrete time intervals $\Delta t$, the propagation of the state vector constitutes a discrete, non-linear estimation problem of the form:

$$x_{k+1} = f(x_k, \omega_k, \alpha_k, v_k)$$

where the dynamic model $f$ is a function of the current state $x_k$, a rotation rate measurement $\omega_k$, an acceleration measurement $\alpha_k$, and sensor noise $v_k$.

The dynamic model implemented by the controller 205 updates the step-cycle and heading estimates using the step-detection algorithm and heading-estimation process described above. It also evaluates a position-update equation incorporating distance values determined using the step detection algorithm.

The change in 2D position, as a function of total fractional step count and user heading, is given by $$\Delta x_k = \Delta\phi_k L_k \cos(\psi_k)$$

$$\Delta y_k = \Delta\phi_k L_k \sin(\psi_k) \quad (4)$$

where $\Delta\phi_k = \phi_{k+1} - \phi_k$ is the increment in the total fractional step count.

In this way, the dynamics of the state vector can be described by combining the outputs of the step-detection algorithm (implementing Equation 1), user heading process (implementing Equations 2, 3), and position-update algorithm (implementing Equation 4), resulting in the following dynamic model setup:

$$f(x_k, \omega_k, \alpha_k, v_k) = \begin{bmatrix} x_k \\ y_k \\ \psi_k \\ 0 \\ L_k \end{bmatrix} + \begin{bmatrix} \Delta\phi_k L_k \cos(\psi_k) \\ \Delta\phi_k L_k \sin(\psi_k) \\ \omega_k^T \gamma_k \Delta t \\ R(\omega_k \Delta t)\gamma_k \\ 0 \end{bmatrix}$$

In the dynamic model setup, the position and user heading equations are implemented directly, and $\Delta\phi_k$ is the result of the step detection algorithm which determines the total fractional step count, based on the last N measurements provided by the accelerometer 210 as described above.

Having established the state vector, x, and the dynamic model, $f$, the extended Kalman filter (EKF) setup of the pedestrian dead reckoning algorithm, implemented by the controller 205, will now be described.

Figure 8:
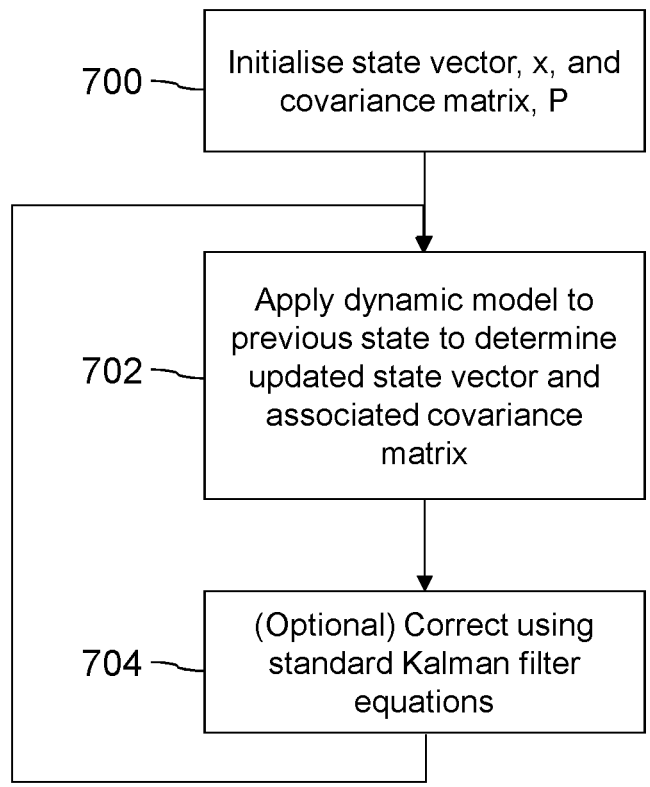
FIG. 8 is a flow chart showing operations carried out by the positioning according to a pedestrian dead reckoning process.

FIG. 8 provides an overview of the steps performed.

The EKF setup of the PDR algorithm consists of an initialization phase, a propagation phase and a correction phase.

In the initialisation phase (step 700) initial values of the state vector, x, and a covariance matrix $P_0$, based on uncorrelated noises of the initial state parameters (except for the 2D position), are set, based on measurements from the IMU 209, as:

$$\hat{x}_0 = \begin{bmatrix} \hat{x}_0 \\ \hat{y}_0 \\ \hat{\psi}_0 \\ \hat{\gamma}_0 \\ \hat{L}_0 \end{bmatrix}, P_0 = \begin{bmatrix} P_{p_0} & & \cdots & & 0 \\ & \sigma_{\psi_0}^2 & & & \vdots \\ \vdots & & P_{\gamma_0} & & \\ 0 & \cdots & & & \sigma_{L_0}^2 \end{bmatrix}$$

where $P_{p_0}$ is a 2-by-2 covariance matrix of 2D position, $\sigma_{\psi_0}^2$ is the user heading variance, $P_{\gamma_0}$ is a 3-by-3 covariance matrix of the gravity vector, and $\sigma_{L_0}^2$ is the step length variance. These initial values may be set in a similar way to the initialisation processes described above. An alternative way to initialize the state is to set the initial position $\hat{p}_0$ and user heading $\hat{\psi}_0$ to zero, in which case the filter will estimate the relative position and user heading over time.

In the propagation phase (step 702), the state vector is updated as discrete data is received from the IMU 209 at regular time intervals $\Delta t$. The IMU data comprises a measured rotation rate $\overline{\omega}_k$ from the gyroscope 211 and an acceleration measurement $\overline{\alpha}_k$ from the accelerometer 210.

The expected value of the propagated state, $\overline{x}_{k+1}$ as well as its covariance, $P_{k+1}$, (i.e. an updated error term) can then be determined by applying the dynamic model (in step 702) as $$\overline{x}_{k+1} = f(\overline{x}_k, \omega_k, \alpha_k)$$

$$P_{k+1} = F_k P_k F_k^T + G_k Q G_k^T$$

where:
i. $F_k$ is the Jacobian F of $f$ evaluated at $\overline{x}_k$. This Jacobian is composed of its individual components described in relation to the step detection (1), user heading (2, 3) and position estimation (4) equations, giving $F_k$ as:

$$F_k = \begin{bmatrix} 1 & 0 & -\Delta\overline{y}_k & 0^T & \Delta\overline{x}_k/L_k \\ 0 & 1 & \Delta\overline{x}_k & 0^T & \Delta\overline{y}_k/L_k \\ 0 & 0 & 1 & \omega^T \Delta t & 0 \\ 0 & 0 & 0 & R(\overline{\omega}_k \Delta t) & 0 \\ 0 & 0 & 0 & 0^T & 1 \end{bmatrix}$$

where 0 is a 3×1 vector of zeros.
ii. $G_k$ is a matrix describing the relationship between the process noise and the state vector given by:

$$G_k = \begin{bmatrix} 0^T \\ 0^T \\ \overline{\gamma}_k^T \\ [\gamma_k]_\times \\ 0^T \end{bmatrix}$$

iii. Q is the 3-by-3 covariance matrix of the gyroscope 211 where
$Q_{11} = (\sigma_{\omega_x} \Delta t)^2$, $Q_{22} = (\sigma_{\omega_y} \Delta t)^2$, $Q_{33} = (\sigma_{\omega_z} \Delta t)^2$ In some embodiments in which the state vector is measured directly, the standard Kalman filter equations can optionally be applied for state corrections (in optional step 704). Examples of direct measurements include position measurements based on trilateration of ultrasound ranges (giving an xy-position $\hat{p}$ with covariance $P_{\hat{p}}$), average step length measurements based on travelled distance $$\text{(e.g. } \hat{L} = \frac{\|p_2 - p_1\|}{\phi_2 - \phi_1}\text{)},$$

or user heading measurements ($\hat{\psi}$) based on magnetic measurements and/or ultrasound Doppler-shift velocity vectors.

Thus, for each measurement output by the IMU 209, the state vector may be updated, providing an updated position estimate and heading of the person 6 carrying the mobile device 7, along with associated error terms, by implementing the step detection algorithm described above.

Combining Range Estimates

Having described how the pedestrian dead-reckoning state vector is used to provide a position estimate of the mobile device 7, the combining of this position estimate with TOF-based position measurements to more accurately determine the position of the mobile device 7 will now be described.

As described above, a position of the mobile device 7 may be determined, without using the IMU 209, by solving an optimization problem for range measurements between the mobile device 7 and the individual ultrasound transmitter units 2, 3, 4, 5 based on TOF measurements of ultrasound signals using a cost function, $J_1$:

$$J_1(r; r_i, R_i) = \frac{\sum w_i((r-r_i)^2 - R_i^2)}{\sum \text{rel\_w}_i}$$

Combining such TOF position data with position data estimated using the step detection algorithm and pedestrian dead reckoning state vector described above can provide improved positioning accuracy. Moreover, a time series of position estimates may potentially then be updated as frequently as the update frequency of the IMU 209, which may be substantially higher than the rate of ultrasound signal transmissions—e.g. more often than once per second (however, such faster updating is not essential, and the optimization calculation may be performed less often than on every IMU update in some embodiments). Incorporating dead-reckoning can also be useful for continuing to track the mobile device 7 accurately when it moves out of range of some or all of the ultrasound transmitters 2, 3, 4, 5 of the system 100.

The ultrasound positioning and the PDR process can be regarded as two separate processes, each based on its own set of sensor data and producing independent results. Therefore, finding the optimum position requires some form of data fusion between the two processes. This could be achieved, using a naïve approach, by calculating a first independent position estimate from the ultrasound positioning system, and a second independent position estimate using the PDR process, and fusing the two position estimates together using the standard Kalman filter equations.

However, in embodiments of the invention, an improved position estimate may instead be determined by combining external-range data obtained using the external transmitters 2-5 with dead-reckoning data obtained from the internal IMU measurements in a single optimization process, e.g. by incorporating data from the PDR state vector described above in the ultrasound positioning cost function $J_1$.

Two different exemplary approaches for doing this are described below.

The first approach is based on converting PDR data into a "synthetic" range measurement which can be directly incorporated into the ultrasound positioning cost function, $J_1$, as defined above, resulting in a single augmented cost function $J_1^*$ containing an additional range term, associated with a "virtual" transmitter, with properties that depend on values determined using the PDR process.

The second approach is to incorporate the latest position estimate determined using the PDR algorithm into an optimisation routine involving the ultrasound positioning cost term, $J_1$, in the form of an additional cost term, $J_2$, that encourages the overall position estimate to be close to the latest dead-reckoning position estimate. This term may be weighted by a scaling factor, $\alpha$. An improved position estimate for the mobile device 7 may then be determined, e.g. following each IMU update, by minimising the cost function, $J_3 = J_1 + \alpha J_2$.

Approach I—Converting to a Synthetic Range Measurement

Some embodiments implement a first method to combine position estimates determined using ultrasound measurements with those determined using the PDR approach described above, which involves converting the travelled distance, as estimated by the PDR algorithm, into a range measurement centred on the initial position of the current state vector. In effect, this creates a "synthetic transmitter" located at an origin corresponding to the initial position of the state vector. The step detection dead-reckoning may be used to determine a synthetic range, which may then be treated identically to the range estimates for the ultrasound transmitter units 2, 3, 4, 5 determined using TOF measurements.

Figure 9:
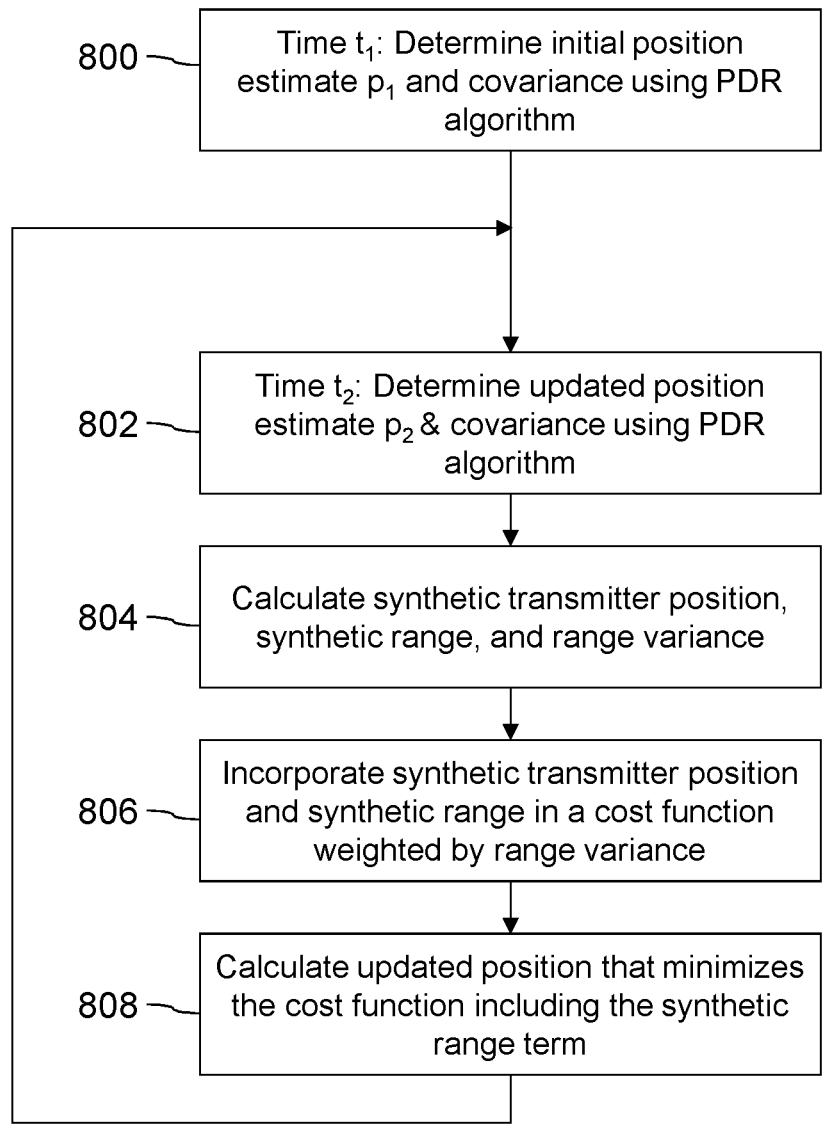
FIG. 9 is a flow chart showing operations carried out by the positioning as part of a synthetic-range based position estimation process.

FIG. 9 shows the steps carried out as part of such a synthetic range based position estimation process.

To determine the synthetic range estimate, an initial position estimate, $\bar{p}_1$, derived from the corrected state of the PDR algorithm, recorded at a time $t_1$, is stored in the memory 208 of the mobile device 7 in step 800. At a second later time, $t_2$ (e.g. the next time at which the IMU 209 updates), an updated position estimate $\bar{p}_2$ and corresponding covariance $P_{p_2}$ (corresponding to the most recent corrected state of the PDR algorithm) are determined, in step 802, by the controller 205 of the mobile device 7 using the PDR algorithm described above. An estimated range, $\bar{r}$, between the initial position and the updated position, and an approximate range variance $\sigma_R^2$ are then determined, as will be described in the following, in step 804.

The initial position, $\bar{p}_1$, of the mobile device 7 is incorporated into the cost function as if it were the position of a synthetic transmitter (i.e. equivalent to another transmitter position $r_i$ in the ultrasound positioning cost function $J_1$ above). A range measurement, $\bar{r}$ is also incorporated, as if it the range, $R_i$, between the synthetic transmitter and the mobile device 7 in the positioning cost function $J_1$. This value is calculated by the controller 205 as the distance between the synthetic transmitter position at time $t_1$ and the estimated position at time $t_2$, i.e. as $\bar{r} = \|\bar{p}_2 - \bar{p}_1\|$.

The range variance, $\sigma_R^2$, can be used as an error term for weighting the contribution from the synthetic dead-reckoning transmitter in the augmented cost function. It is computed from the position covariance matrix at time $t_2$, which is obtained by a first order Taylor expansion of the range calculation:

$$\sigma_R^2 = H P_{p_2} H^T$$

where H is the Jacobian defined by:

$$H = \frac{1}{\bar{r}}(\bar{p}_2 - \bar{p}_1)$$

The synthetic transmitter position, $\bar{p}_1$ and the synthetic range, $\bar{r}$, are then directly incorporated into the cost function $J_1$ given above (in step 806), as an additional transmitter position and an additional range between the transmitter device and the mobile device 7, with a corresponding weight, $w_p$ given by the range variance $\sigma_R^2$ and a scaling factor $\alpha$.

The resulting cost function, $J_1^*$, incorporating the synthetic range $\bar{r}$ and the weighted range variance $\sigma_R^2$ is therefore:

$$J_1^*(r; r_i, R_i) = \frac{\sum w_i((r-r_i)^2 - R_i^2) + w_p((r-\bar{p}_1)^2 - \bar{r}^2)}{\sum \text{rel\_w}_{i,p}}$$

where rel_$w_{i,p}$ is an optional relative component representing the relative confidence in the reliability of the measurement from each transmitter unit 2-5, indexed by i, and supplemented by the synthetic transmitter, p.

This augmented cost function $J_1^*$ can then be minimized over r, to determine an updated position estimate, r, taking into account the additional synthetic transmitter.

This approach allows a synthetic range term to be included in the cost function $J_1^*$ directly, without introducing more complexity to the cost function.

Thus in some embodiments the PDR algorithm used by the controller 205 to calculate a synthetic transmitter position and a synthetic range, which are weighted by the range variance and added to an ultrasound positioning cost term in a cost function, $J_1^*$. The cost function $J_1^*$ may then be minimized to determine an improved position estimate for the mobile device 7.

By solving a minimization problem involving this cost function, in step 808, using any suitable technique such as the Newton-Raphson method or a quasi-Newton method, the controller 205 can calculate an updated position estimate.

Including a synthetic range term in the positioning cost function $J_1^*$ as described here can be done without relying on absolute heading. The PDR process may therefore, in some embodiments use only relative headings (i.e., determined relative to a default initial heading that may be set to zero).

However, although no heading term is included in the cost function $J_1^*$ itself, changes in heading are nevertheless taken into account when calculating the positions estimates $p_1$, $p_2$ using the PDR algorithm. The augmented cost function $J_1^*$ includes a term centred around the earlier dead-reckoning position estimate, $p_1$, and hence the updated overall position estimate, r, is dependent on changes in heading as the user walks with the mobile device 7, determined from IMU measurements. By updating the augmented cost function $J_1^*$ at, or closer to, the IMU update frequency, or at least more often than the rate of ultrasound transmissions, an updated position can be determined at a higher frequency, and with greater accuracy, than is possible using range estimates determined from TOF measurements alone.

In some variant embodiments, if the time between updates is small enough (e.g. less than the duration of one user step), then a reasonable assumption is that the user heading remains approximately constant between updates. In this case, the heading estimation may optionally be removed from the PDR dynamic model, and the synthetic range and the range variance to be added to the cost function may be reduced to terms involving only step length and total fractional step count, as well as their associated covariances:

$$\bar{r} = \Delta \bar{\phi} \bar{L}$$

$$\sigma_R^2 = \Delta \bar{\phi}^2 P_L + \bar{L}^2 P_{\Delta \phi}$$

While an initial position, $p_1$, is still necessary as a simulated beacon position, the synthetic range, $\bar{r}$, need no longer depend on changes in heading, but only on the magnitude of distance travelled by the mobile device 7 (i.e. step length multiplied by the value of the total accumulated steps taken). This can reduce the computational load on the controller 205.

Approach II—Using Mahalanobis Distance

An alternative method, implemented in some embodiments, is to incorporate the PDR-derived position into the optimization routine by adding a second cost term, $J_2$, that increases with distance from the latest position estimate determined by the PDR algorithm.

Figure 10:
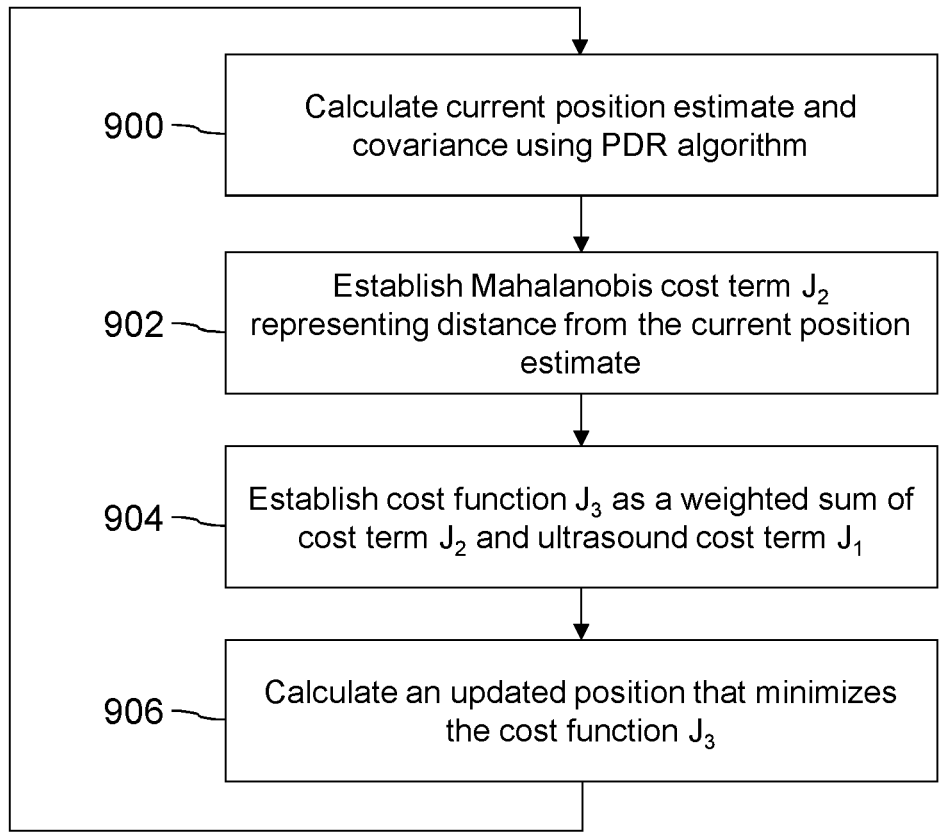
FIG. 10 is a flow chart showing operations carried out by the positioning as part of a Mahalanobis distance based position estimation process.

FIG. 10 outlines the steps of an exemplary implementation of this method.

In contrast to the first approach, this second approach does not rely on a synthetic transmitter position and a range, determined from two different position estimates determined from the PDR state vector, but instead relies on a single dead-reckoning position estimate and the dead-reckoning covariance matrix $P_{p_k}$.

To achieve this, the most recent position estimate $p_k=(x_k, y_k)$ and estimated 2-by-2 covariance matrix $P_{p_k}$ are determined, in step 900, using the PDR algorithm as described above. The distance between the most recent position, determined using the PDR algorithm, $p_k$, and the estimated position, r, that is to be determined through the cost optimization process (i.e. the same r used in the ultrasound positioning cost term $J_1$), is then given by a second cost term $J_2$ (established in step 902). This distance may, in some embodiments, be given by the Mahalanobis distance, i.e.:

$$J_2(r;p_k) = \sqrt{(r-p_k)^T P_{p_k}^{-1}(r-p_k)}$$

The cost term $J_2(r;p_k)$ is then weighted, using a scaling factor $\alpha$, and added to the cost term $J_1$ defined above, to establish, in step 904, a cost function $J_3$ for determining the position of the mobile device 7, as follows:

$$J_3(r; r_i, R_i, p_k) = \frac{\sum w_i\left((r - r_i)^2 - R_i^2\right)}{\sum \text{rel\_}w_i} + \alpha\sqrt{(r - p_k)^T P_{p_k}^{-1}(r - p_k)}$$

Solving a minimization problem based on this cost function, in step 906, using any suitable technique such as the Newton-Raphson method or a quasi-Newton method, then enables the controller 205 to calculate an updated position estimate.

This method produces an improved heading estimate due to the added constraints on the optimized position. The heading correction is an efficient process based on the weighted means estimated by the ultrasound algorithm and PDR process, where the weights are determined by their respective variances.

However, in other embodiments of this second approach, alternative methods may be used to extend the ultrasound cost term. For instance, in some embodiments, the position estimate determined using the PDR algorithm may be converted into a matrix of distinct 'sigma points' (as used in an unscented Kalman filter) each weighted by a respective position covariance, and a second cost term, $J_3$, may be defined based on the weighted distance to each of the sigma points.

More generally, it will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method of estimating a position of a mobile device, the method comprising:
   receiving external-range data representative of a range between the mobile device and an external unit, wherein the external-range data is determined using a signal travelling between the external unit and the mobile device;
   receiving acceleration data, determined from an accelerometer of the mobile device, wherein the acceleration data is representative of acceleration of the mobile device due to a movement of the mobile device as it is carried by a person;

processing the acceleration data in a step-detection algorithm to determine step-distance data representative of a time series of step-data-based distances travelled by the mobile device as carried by the person;

processing the step-distance data to determine a step-data-based position estimate for the mobile device;

determining a position estimate for the mobile device by solving an optimisation problem for an objective function comprising a first cost term that depends on distance to positions located at said range from the external unit, and a second cost term that depends on distance to said step-data-based position estimate or to positions located at a step-data-based distance from said step-data-based position estimate; and controlling or applying a weighting of the second cost term relative to the first cost term for solving the optimisation problem.

2. The method of claim 1, wherein the second cost term depends on distance to positions located at a step-data-based distance from said step-data-based position estimate, and wherein the step-data-based distance is determined from one or more preceding step-data-based position estimates.

3. The method of claim 2, wherein the second cost term is weighted in the objective function at least in part in dependence on a variance of the step-data-based distance over time.

4. The method of claim 1, wherein the second cost term depends on distance to said step-data-based position estimate, and wherein the second cost term is equal or proportional to a Mahalanobis distance to the step-data-based position estimate.

5. The method of claim 1, wherein determining the step-data-based position estimate comprises processing an initial position estimate, determined from an earlier solving of the optimisation problem, to update the initial position estimate based on the time series of step-data-based distances.

6. The method of claim 1, comprising combining heading data for the mobile device with the step-distance data to determine a motion vector or series of motion vectors, and using the motion vector or series of motion vectors to determine the step-data-based position estimate.

7. The method of claim 1, wherein the acceleration data comprises a time series of acceleration values, and wherein processing the acceleration data in the step-detection algorithm to determine the step-distance data comprises fitting a periodic function to the time series of acceleration values to determine a characteristic frequency representative of a step frequency of a person carrying the mobile device.

8. The method of claim 1, wherein the external-range data is determined from timing information for the signal travelling between the external unit and the mobile device.

9. The method of claim 1, wherein the acceleration data comprises a time series having a first update frequency, and the external-range data comprises a time series having a second update frequency, and wherein the first update frequency is higher than the second update frequency.

10. The method of claim 1, wherein the first cost term is an increasing function of distance between the position estimate to be determined and positions located at said range from the external unit.

11. The method of claim 1, wherein the objective function comprises a plurality of cost terms, each depending on distance to respective positions located at a respective range from a respective external unit of a plurality of external units configured to exchange respective signals with the mobile device.

12. The method of claim 1, wherein the second cost term is an increasing function of distance between the position estimate to be determined and said step-data-based position estimate, or positions located at a step-data-based distance from said step-data-based position estimate.

13. The method of claim 1, wherein each cost term is a continuously differentiable function of distance, and the objective function comprises a linear combination of the first and second cost terms.

14. The method of claim 1, wherein the second cost term is weighted relative to the first cost term in the optimisation problem in dependence on a variable weight parameter.

15. A positioning system for estimating a position of a mobile device, the positioning system comprising a processing system, wherein the processing system comprises a processor and is configured to:

receive external-range data representative of a range between the mobile device and an external unit, wherein the external-range data is determined using a signal travelling between the external unit and the mobile device;

receive acceleration data, determined from an accelerometer of the mobile device, wherein the acceleration data is representative of acceleration of the mobile device due to a movement of the mobile device as the mobile device is carried by a person;

process the acceleration data in a step-detection algorithm to determine step-distance data representative of a time series of step-data-based distances travelled by the mobile device as carried by the person;

process the step-distance data to determine a step-data-based position estimate for the mobile device;

determine a position estimate for the mobile device by solving an optimisation problem for an objective function comprising a first cost term that depends on distance to positions located at said range from the external unit, and a second cost term that depends on distance to said step-data-based position estimate or to positions located at a step-data-based distance from said step-data-based position estimate; and control or apply a weighting of the second cost term relative to the first cost term for solving the optimisation problem.

16. A non-transitory computer-readable storage medium storing instructions for estimating a position of a mobile device, which, when executed on a processing system comprising a processor, cause the processing system to:

receive external-range data representative of a range between the mobile device and an external unit, wherein the external-range data is determined using a signal travelling between the external unit and the mobile device;

receive acceleration data, determined from an accelerometer of the mobile device, wherein the acceleration data is representative of acceleration of the mobile device due to a movement of the mobile device as the mobile device is carried by a person;

process the acceleration data in a step-detection algorithm to determine step-distance data representative of a time series of step-data-based distances travelled by the mobile device as carried by the person;

process the step-distance data to determine a step-data-based position estimate for the mobile device;

determine a position estimate for the mobile device by solving an optimisation problem for an objective function comprising a first cost term that depends on distance to positions located at said range from the external unit, and a second cost term that depends on distance to said step-data-based position estimate or to positions located at a step-data-based distance from said step-data-based position estimate; and control or apply a weighting of the second cost term relative to the first cost term for solving the optimisation problem.

* * * * *